(12) United States Patent
Xu et al.

(10) Patent No.: US 8,238,374 B2
(45) Date of Patent: Aug. 7, 2012

(54) METHODS AND APPARATUS FOR BALANCING MODULATION IN CELLULAR COMMUNICATIONS OVER NOISY CHANNELS

(75) Inventors: Zhaoji Xu, Beijing (CN); Zhu Yan Zhao, Beijing (CN)

(73) Assignee: Intellectual Ventures I LLC, Wilmington, DE (US)

( * ) Notice: Subject to any disclaimer, the term of this patent is extended or adjusted under 35 U.S.C. 154(b) by 1027 days.

(21) Appl. No.: 11/660,430

(22) PCT Filed: Aug. 17, 2004

(86) PCT No.: PCT/IB2004/002674
§ 371 (c)(1),
(2), (4) Date: Dec. 4, 2007

(87) PCT Pub. No.: WO2006/018669
PCT Pub. Date: Feb. 23, 2006

(65) Prior Publication Data
US 2008/0311920 A1    Dec. 18, 2008

(51) Int. Cl.
*H04J 3/00* (2006.01)
(52) U.S. Cl. .......... 370/476; 370/479; 455/450
(58) Field of Classification Search .......... None
See application file for complete search history.

(56) References Cited

U.S. PATENT DOCUMENTS

| | | | | |
|---|---|---|---|---|
| 5,056,112 | A * | 10/1991 | Wei .............................. | 375/280 |
| 5,923,679 | A * | 7/1999 | Itoh et al. ...................... | 714/752 |
| 6,259,744 | B1 * | 7/2001 | Lee et al. ...................... | 375/264 |
| 6,437,714 | B1 * | 8/2002 | Kim et al. ...................... | 341/81 |
| 7,349,494 | B2 * | 3/2008 | Yu et al. ........................ | 375/324 |
| 7,545,731 | B2 * | 6/2009 | Agin et al. .................... | 370/204 |
| 2003/0079170 | A1 | 4/2003 | Stewart et al. | |
| 2004/0071172 | A1 | 4/2004 | Beale | |

(Continued)

OTHER PUBLICATIONS

Communication from the European Patent Office for Application 04 769 133.2, dated Mar. 26, 2010.

(Continued)

*Primary Examiner* — Nittaya Juntima
*Assistant Examiner* — Rhonda Murphy

(57) ABSTRACT

Methods and apparatus for balancing multi-symbol modulation schemes in cellular communications are provided. The modulation schemes include a plurality of modulation symbols, each of which codes a predefined bit group, which includes one or more bits. The bit groups define different bit positions for bits within the bit groups. The bit positions of the modulation symbols are associated with different error probability levels. Each error probability level defines a probability level of an erroneous bit value at a defined bit position in the bit group, which is obtained by a mapping operation from the modulation symbol transmitted over a radio frequency channel with noise. Binary content to be modulated is provided in form of code blocks I (where i=1 to n). Each of the code blocks is carried on a corresponding code channel i. The code blocks on the code channels are supplied to the modulation schemes in that each code channel is associated with one predefined bit position of the bit groups to enable a mapping to modulation symbols. The bit groups are formed from the binary content of the code blocks in accordance with the code channel-to-bit position association defined above. The binary content of at least two code blocks is shuffled, distributed, or scattered in accordance with predetermined shuffling, distributing, or scattering rules. The shuffling, distributing, or scattering aims to achieve substantially balanced or same error probability levels for said code channels. The shuffling operation should be performed to achieve a substantially evenly distribution of the binary content upon the involved code blocks.

30 Claims, 12 Drawing Sheets

U.S. PATENT DOCUMENTS

2004/0177306 A1* 9/2004 Hiraki .................... 714/748
2008/0148133 A1* 6/2008 Duggan .................. 714/796

OTHER PUBLICATIONS

W. Adi et al. "Variable redundancy coding for mobile channels", Computers and Communications, 2001, Proceedings, Sixth IEEE Symposium on Computers and Communications, Hammamet, Tunisia, Jul. 3-5, 2001, pp. 580-584.

"3$^{rd}$ Generation Partnership Project; Technical Specification Group Radio Access Network; Multiplexing and channel coding (FDD) (Release 6)", 3GPP TS 25.212 V6.2.0 (Jun. 2004), pp. 1-76.

"Enhanced HARQ Method with Signal Constellation Rearrangement", TSG-RAN Working Group 1 Meeting #19, Las Vegas, USA, Feb. 27-Mar. 2, 2001, pp. 1-11.

International Search Report of International Application No. PCT/IB2004/002674—Date of Completion of Search—May 24, 2005.

* cited by examiner

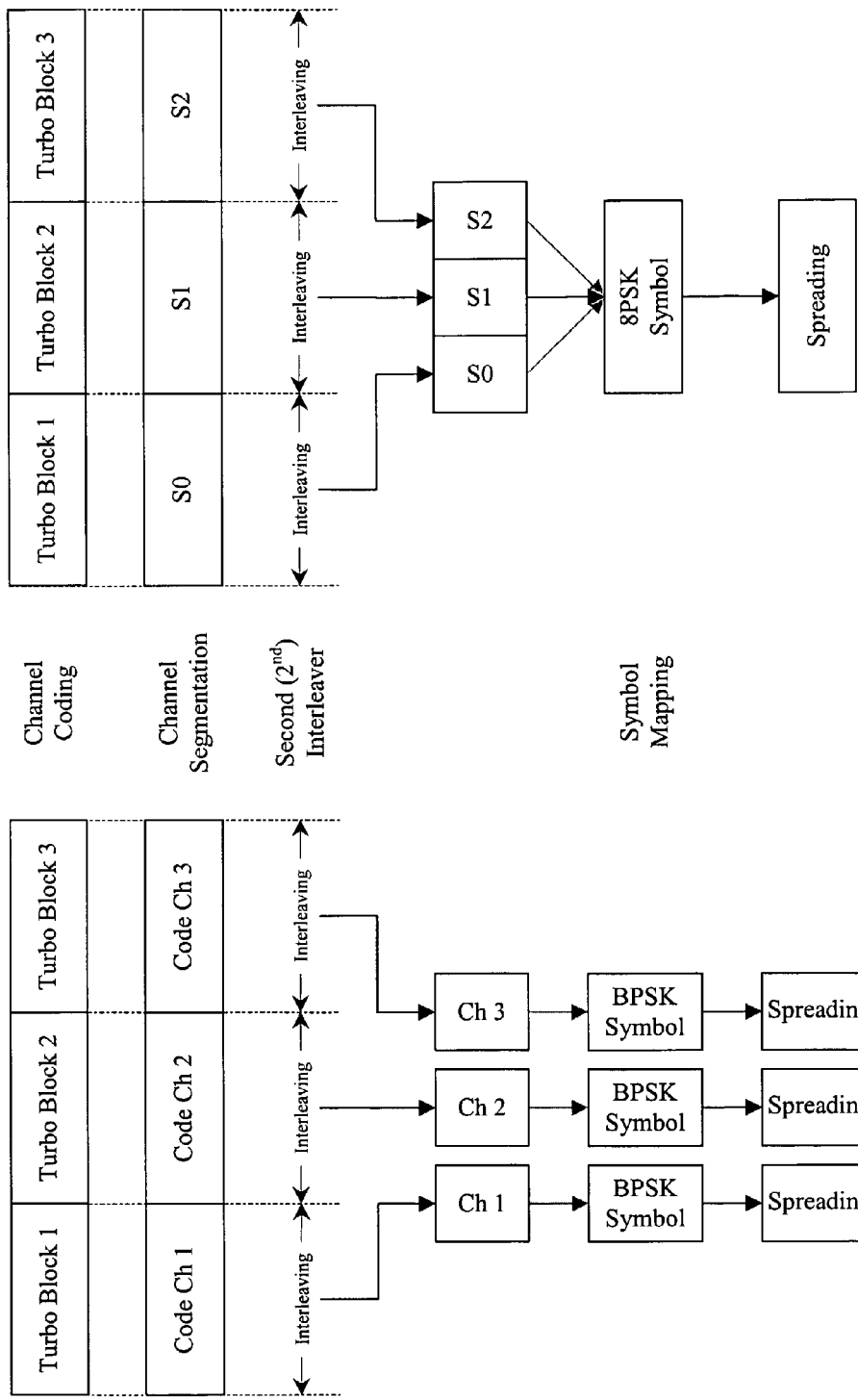

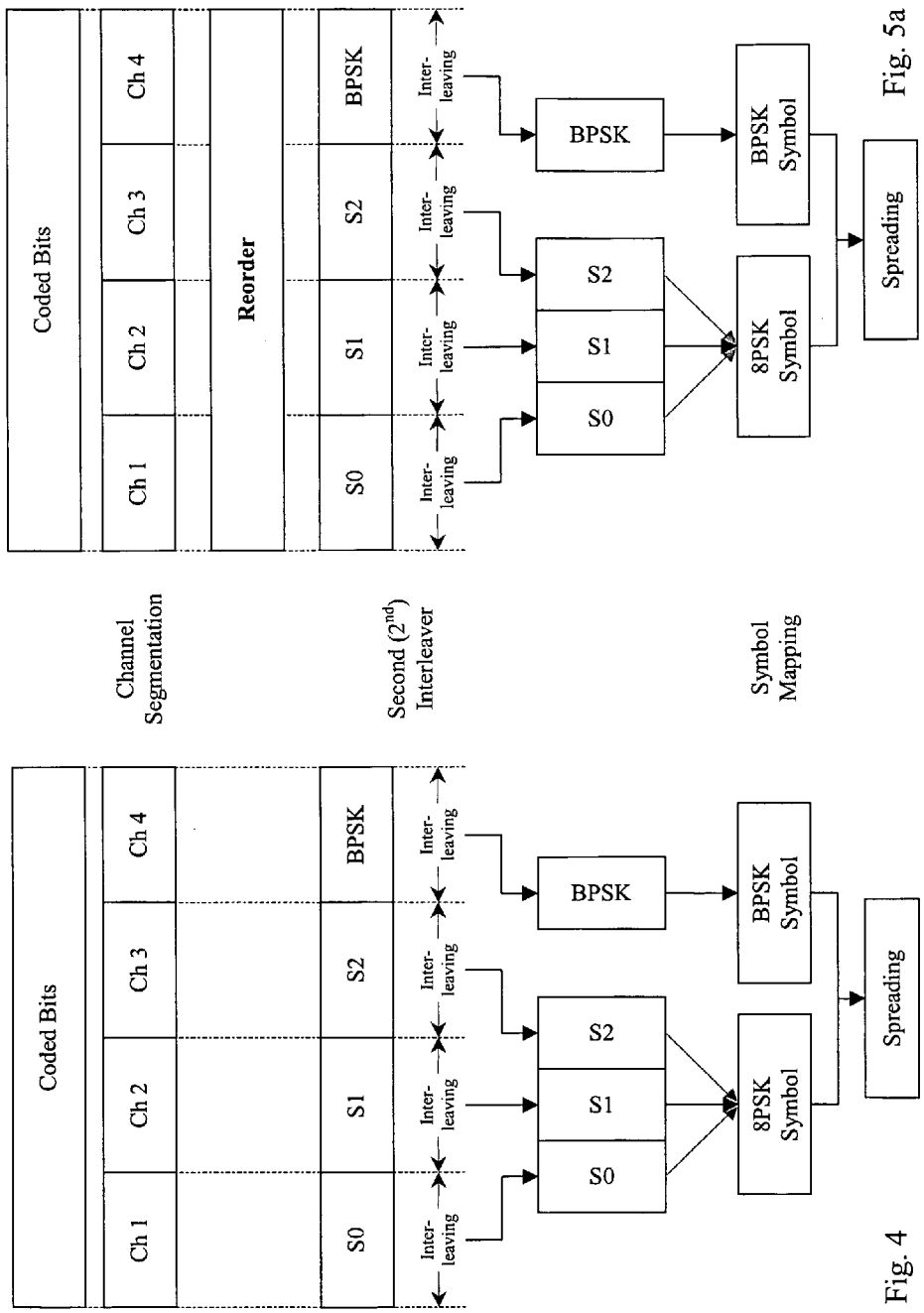

| | | | | | |
|---|---|---|---|---|---|
| A0 | B1 | C2 | D3 | A4 | …… |
| B0 | C1 | D2 | A3 | B4 | …… |
| C0 | D1 | A2 | B3 | C4 | …… |
| D0 | A1 | B2 | C3 | D4 | …… |

Pattern 1

| | | | | | |
|---|---|---|---|---|---|
| B0 | C1 | D2 | A3 | B4 | …… |
| C0 | D1 | A2 | B3 | C4 | …… |
| D0 | A1 | B2 | C3 | D4 | …… |
| A0 | B1 | C2 | D3 | A4 | …… |

Pattern 2

| | | | | | |
|---|---|---|---|---|---|
| C0 | D1 | A2 | B3 | C4 | …… |
| D0 | A1 | B2 | C3 | D4 | …… |
| A0 | B1 | C2 | D3 | A4 | …… |
| B0 | C1 | D2 | A3 | B4 | …… |

Pattern 3

| | | | | | |
|---|---|---|---|---|---|
| D0 | A1 | A2 | C3 | D4 | … |
| A0 | B1 | B2 | D3 | A4 | …… |
| B0 | C1 | C2 | A3 | B4 | …… |
| C0 | D1 | D2 | B3 | C4 | …… |

Pattern 4

Fig. 8c
Example Pattern Table

METHODS AND APPARATUS FOR BALANCING MODULATION IN CELLULAR COMMUNICATIONS OVER NOISY CHANNELS

CROSS-REFERENCE TO RELATED APPLICATIONS

This application is a U.S. National Phase application under 35 U.S.C. §371 of PCT Application No. PCT/IB2004/002674, filed Aug, 17, 2004.

BACKGROUND

The present invention relates to the field of multi-symbol modulation symbol-dependent error probability levels in symbol transmission over noisy physical channels. In particular, the present invention relates to the field of cellular communications employing phase shift keying mechanisms for modulation/demodulation.

The widespread use of Internet Protocol (IP) based services and in particular Transmission Control Protocol (TCP) based services is characteristic for data communication within today's Internet. Efforts are under development to migrate those services available over the Internet to wireless networks and especially to the third generation wireless networks being currently introduced into mass market. Network operators and service providers operating in the field of third generation wireless networks hope for benefiting from the high data rate packet services operable with the third generation wireless networks in that services available up to now wire-based only might be migrated to wireless networks presenting itself to new economic opportunities. Typical applications, which benefit from high data rates, include video-clips, multimedia, e-mail, telematics, gaming, video-streaming etc.

High Speed Downlink Packet Access (HS-DPA) has been developed and standardized in the context of the Third Generation Partnership Project (3GPP) and in particular for UTRA (UMTS terrestrial radio access) FDD (frequency duplex division) domain. Besides the downlink transmission rate, which addresses the usage of a UMTS communication enabled terminals to download huge amounts of data content in a reasonable period of time, numerous network-based applications, especially data serving applications, demand for enhanced uplink data transmission rates. The typical asymmetric data transmission rates including high downlink data rates and low uplink data rates limit unnecessarily the usability of UMTS communication enabled terminals. The expected development of the hardware capabilities of mobile terminals drive the desire of user to take advantage of complex applications exchanging greater amounts of data, which implies the provision of desirably symmetric high data transmission rates or at least improved uplink data transmission rates exceeding those uplink data transmission rates available today.

Consequently, the development of a corresponding uplink packet access with enhanced uplink data rates has been provoked and is still pushed ahead in the context of the Third Generation Partnership Project (3GPP) and in particular for UTRA (UMTS terrestrial radio access) FDD (frequency duplex division) domain. In general, the enhanced uplink packet access (EUPA) under development addresses Wideband Code Division Multiple Access (WCDMA) transmission methodology. One main component to enable enhanced uplink packet access relates to the signal modulation technology employed for data signal modulation onto a physical data frequency carrier. Currently, phase shift keying (PSK) modulation and in particular 8-level phase shift key modulation (8-PSK) is under consideration.

In principle, modulation techniques are used to embed a signal (discrete or continuous) onto a carrier wave having a distinct frequency for transmission. Basically, different modulation techniques are distinguished comprising in general amplitude modulation, frequency modulation, and phase modulation. In the context of amplitude modulation (AM), the amplitude of the carrier wave is varied (modulated) in accordance with the signal to be embedded. Correspondingly, in the context of frequency modulation (FM), the frequency of the carrier wave is varied (modulated) in accordance with the signal and further, in the context of phase modulation, the phase angle of the carrier wave is varied (modulated) in accordance with the signal. It shall be noted that phase modulation (PM) can be regarded as a special case of frequency modulation (FM), where the carrier wave modulation is the time derivative of the PM modulating signal.

One specific phase modulation technique is the 8-level or 8-array phase keying modulation. With reference to FIG. 1a, a constellation diagram of 8-PSK Q-I/code modulation is schematically illustrated. 8-PSK modulation technique is a well known modulation scheme, which is for example employed in the context of EDGE standardization. The simplest form of PSK involves a 180° phase change at every transition from 0 to 1 or vice versa in an incoming bit stream. With 8-PSK modulation technique the incoming bit stream can be treated in groups of 3 bits at a time and allows coding and transmission of 8 different symbols, each of which consists of a pre-defined 3 bit sequence. Each 8-PSK symbol corresponds to a variation of the phase angle about $\pi/4$, illustratively depicted by 8-PSK symbols at angles $\phi_i[rad]=\pi/8+i\cdot\pi/4$ (and $\phi_i[deg]=22.5°+i\cdot45°$, respectively), where $i=0, 1, \ldots, 7$. Each 8-PSK symbol is assigned to a pre-defined 3-bit group depicted in FIG. 1a. This means, the 8-PSK symbol at the different phase angles $\phi_i[rad]$ are associated with the 3-bit group $\{s0,s1,s2\}$ in accordance with following table:

| $\phi_i[rad]$ | $\{s0,s1,s2\}$ |
|---|---|
| $\pi/8$ | $\{0,0,0\} \hat{=} 000$ |
| $3\pi/8$ | $\{0,0,1\} \hat{=} 001$ |
| $5\pi/8$ | $\{0,1,1\} \hat{=} 011$ |
| $7\pi/8$ | $\{0,1,0\} \hat{=} 010$ |
| $9\pi/8$ | $\{1,1,0\} \hat{=} 110$ |
| $11\pi/8$ | $\{1,1,1\} \hat{=} 111$ |
| $13\pi/8$ | $\{1,0,1\} \hat{=} 101$ |
| $15\pi/8$ | $\{1,0,0\} \hat{=} 100$ |

Those skilled in the art will appreciate that the higher bandwidth efficiency and improved link level performance gained by the 8-PSK is achieved at the costs of a reduced noise resistance. Because of the fact that the states in 8-PSK are quite close together, the amount of noise required for errors to occur can be relatively small—certainly smaller than the amount of noise that Gaussian Minimum Shift Keying (GMSK) can handle, where GMSK is the standard modulation used by GSM.

With reference to FIG. 1b, soft bit level decisions are illustrated which enable a receiver to reconstruct the 3-bit groups from 8-PSK symbols received. Several soft bit level decisions are applicable for transforming 8-PSK symbols into 3-bit groups each having three bits. One possible soft bit level decisions can be defined mathematically as following:

$$\{s0, s1, s2\} = \begin{Bmatrix} s0 \\ s1 \\ s2 \end{Bmatrix}^T = \begin{Bmatrix} s0 = \begin{cases} 0, & \text{if } \text{Im}\{z\} > 0 \\ 1, & \text{if } \text{Im}\{z\} < 0 \end{cases} \\ s1 = \begin{cases} 0, & \text{if } \text{Re}\{z\} > 0 \\ 1, & \text{if } \text{Re}\{z\} < 0 \end{cases} \\ s2 = \begin{cases} 0, & \text{if }|\text{Re}\{z\}| - |\text{Im}\{z\}| > 0 \\ 1, & \text{if }|\text{Re}\{z\}| - |\text{Im}\{z\}| < 0 \end{cases} \end{Bmatrix}^T,$$

where $\{s0,s1,s2\}$ represents a bit vector mapped to a 8-PSK symbol, where s0 shall be assumed as the most significant bit and s2 shall be assumed as the less significant bit of the 3-bit group obtainable from the bit vector. The soft bit level decisions are illustrated correspondingly in the diagrams of FIG. 1$b$, which include exemplary a symbol vector z referring to the 8-PSK symbol $\phi_i[\text{rad}]=3\pi/8$ and the 3-bit group $001 \hat{=} \{0,0,1\}$. The complex plane, in which the 8-PSK symbol vector z is illustrated, is divided by each soft bit level decision into two half-planes. This means, the value of the soft bits $s_j$ (j=0, 1, 2) are obtainable by identifying the half-plane in which the 8-PSK symbol vector z lies. Herein the 8-PSK symbol vector z lies in the half plane $\text{Im}\{Z\}>0$, $\text{Re}\{z\}>0$, and $|\text{Re}\{z\}|-|\text{Im}\{z\}|<0$, resulting consequently in a 3-bit group 001.

As aforementioned, the 8-PSK suffers at an increased sensitivity to noise. More seriously, the three soft bit decisions required for reconstruction 3-bit groups from 8-PSK symbols have different error possibilities. This means, the error possibilities of the bits within a 3-bit group are unbalanced. Without going into detailed theoretical considerations, it can be found that if the 8 PSK symbol $\phi_i[\text{rad}]=3\pi/8 \hat{=} \{0,0,1\}$ is transmitted, s1 and s2 have the same higher level of error possibility in comparison with s0, which has the lower level of error possibility. With reference to the 8-PSK symbol $\phi_i[\text{rad}]=\pi/8 \hat{=} \{0,0,0\}$ it can be derived that s0 and s2 have the higher error possibility level in comparison with s1, which has the lower error possibility level. In general, it can be conducted that s2 has always the higher level of error possibility and, in dependence on the value of s2, one of both s0 and s1 has the higher level and the other one has the lower level of error possibility. Assuming that the values of s2 are equal-distributed (each having a probability of 0.5), the probability of a higher or lower level of error probability is also equal-distributed for both s0 and s1.

Consequently, the error possibilities of the bits within a 3-bit group are unbalanced, which causes effectively in an unreliable radio frequency transmission channel a reduced overall transmission rate counteracting the higher bandwidth efficiency and improved link level performance originally aimed by the employment of 8-PSK modulation scheme.

BRIEF SUMMARY

The object of the present invention is to provide a methodology, a transmitter apparatus, and a receiver apparatus, which support effective or quasi-balanced error possibility levels in conjunction with modulation schemes having unbalanced error possibility levels for their mapping of modulation symbols to binary representation of the modulation symbols.

The object of the present invention is achieved by introducing a shuffling operation and process before modulation, which shuffles binary content of a plurality of code channels before being supplied to the mapping of an unbalanced modulation scheme, such that after de-shuffling, different error probability levels of the coding channels, which are indirectly caused by different error probability levels associated to the bit positions in the bit groups representation of the modulation symbols, are balanced in view of the coding channels and the code blocks on the coding channels.

According to a first aspect of the present invention, a method for balancing multi-symbol modulation schemes is provided. The modulation schemes include a plurality of modulation symbols, each of which codes a predefined bit group, which includes one or more bits. The bit groups define different bit positions for bits within the bit groups. The bit positions of the modulation symbols are associated with different error probability levels. Each error probability level defines a probability level of an erroneous bit value at a defined bit position in the bit group, which is obtained by a mapping operation from the modulation symbol transmitted over a radio frequency channel with noise. Binary content to be modulated is provided in form of code blocks I (where i=1 to n). Each of the code blocks is carried on a corresponding code channel i. The code blocks on the code channels are supplied to the modulation schemes in that each code channel is associated with one predefined bit position of the bit groups to enable a mapping to modulation symbols. The bit groups are formed from the binary content of the code blocks in accordance with the code channel-to-bit position association defined above. The binary content of at least two code blocks is shuffled, distributed, or scattered in accordance with predetermined shuffling, distributing, or scattering rules. The shuffling, distributing, or scattering aims to achieve substantially balanced or same error probability levels for said code channels. The shuffling operation should be performed to achieve a substantially evenly distribution of the binary content upon the involved code blocks.

According to an embodiment of the present invention, the shuffling is operable by sub-segmenting or dividing the code blocks on the code channels into a plurality of sub-segments; and reordering the sub-segments of the code blocks in accordance with a reordering algorithm. The reordering is performed before formation of the bit groups and mapping to modulation symbols. The sub-segmenting and reordering operations cover are applied onto code blocks on all code channels in common, such that the sub-segments are substantially evenly distributable among the code channels, which finally carry reordered code blocks of the same size or length.

According to an embodiment of the present invention, each code block is additionally interleaved independently from each other. The interleaving is operable before or after the sub-segmenting and reordering operation. The interleaving is performed as a intra-channel interleaving.

According to an embodiment of the present invention, the reordering algorithm is for instance based on reordering pattern tables or permutation algorithms. In particular, the reordering pattern tables tabulate reordering patterns for the reordering of the sub-segments.

According to an embodiment of the present invention, the reordering algorithm is a static or a dynamic reordering algorithm. The dynamic reordering algorithm is for instance altered in accordance with error correction mechanisms applicable with wireless transmission techniques.

According to an embodiment of the present invention, the sub-segments comprise one or more bits.

According to an embodiment of the present invention, a hybrid automatic repeat request (HARQ) mechanism is employed for retransmissions of erroneous first transmissions. The reordering algorithm applied for a first transmission differs from the reordering algorithm applied for a first retransmission.

According to an embodiment of the present invention, the reordering algorithm comprises a table of reordering patterns. Each reordering pattern is designated for one of including the first transmission and the j-th retransmissions, where j=1 to a maximum number of retransmissions. The maximum number of retransmissions is definable with the employed hybrid automatic repeat request (HARQ) mechanism.

According to an embodiment of the present invention, the shuffling includes an overall interleaving scheme, which comprises interleaving two or more code blocks on their code channels in common, in accordance with a first interleaving scheme and in accordance with a first interleaving algorithm. The remaining code blocks on their code channels are interleaved separately from each other, in accordance with a common interleaving scheme or with individual interleaving schemes and in accordance with a common interleaving algorithm or with individual interleaving algorithms. The first interleaving algorithm and the common interleaving algorithm or the individual interleaving algorithms differ from each other.

According to an embodiment of the present invention, the first interleaving scheme is an inter-channel interleaving scheme and the common interleaving scheme or the individual interleaving schemes are intra-channel interleaving schemes.

According to an embodiment of the present invention, the interleaving schemes are selected by considering the different error probability levels associated with the code channels.

According to an embodiment of the present invention, the number of code channels is defined by a total bit length of group lengths of all employed modulation schemes.

According to an embodiment of the present invention, the modulation schemes comprise at least one $2^m$-array phase shift keying modulation having $2^m$ modulation symbols. Each of modulation symbols is assigned to a predefined group of m bits, which forms the corresponding bit group of the modulation symbol. The predefined association between bit groups and modulation symbol enables mapping of any binary coded content into symbol coding and vice versa.

According to an embodiment of the present invention, the modulation schemes comprise 8-array phase shift keying (8-PSK) modulation having eight different modulation symbols, each of which is assigned to a predefined bit group having three bits; and/or binary (bi) phase shift keying (BPSK) modulation, which is designated by two symbols, each of which is assigned to a predefined group of one bit, i.e. 0 and 1.

According to an embodiment of the present invention, the method further includes providing data to transport channel structure in form of one transport block; appending a cyclic redundancy check attachment; segmenting the transport block into said one or more code blocks; applying a channel coding on the code blocks; applying a rate matching on the code blocks; and segmenting the code blocks onto said code channels in accordance with the modulation schemes.

According to an embodiment of the present invention, the aforementioned method is applicable with a transmitter operable with wideband code division multiple access (WCDMA) and in particular with frequency division duplex (FDD).

According to an embodiment of the present invention, the method is applicable for enhanced uplink packet access (EUPA).

According to a second aspect of the present invention, a method for balancing multi-symbol modulation schemes is provided. The multi-symbol modulation includes a plurality of modulation symbols, each of which codes a predefined bit group of one or more bits. Th bit groups define different bit positions for bits within the bit groups. The bit positions of the modulation symbols are associated with different error probability levels conditioned by the multi-symbol modulation schemes. Binary content to be de-modulated is received in form of a radio frequency signal, which is defined on the basis of the modulation symbols. The radio frequency signal has been generated in accordance with balancing multi-symbol modulation schemes defined above. A de-modulation of said signal in accordance with the modulation schemes results in code blocks, each of which on a code channel. Each code channel is associated with one predefined bit position of the bit groups, which result from de-modulation. The binary content of at least two code blocks is de-shuffled in accordance with predetermined de-shuffling rules such that substantially balanced error probability levels for the code channels are obtained.

According to a third aspect of the present invention, computer program product for balancing multi-symbol modulation schemes is provided. The computer program product comprises program code sections for carrying out the method according to an aforementioned embodiment of the invention, when the program is run on a controller, processor-based device, a computer, a terminal, a network device, a mobile terminal, or a mobile communication enabled terminal. Alternatively, an application specific integrated circuit (ASIC) may implement one or more instructions that are adapted to realize the aforementioned steps of the method of an aforementioned embodiment of the invention, i.e. equivalent with the aforementioned computer program product.

According to a fourth aspect of the invention, a computer program product is provided, which comprises program code sections stored on a machine-readable medium for carrying out the steps of the method according to an aforementioned embodiment of the invention, when the computer program product is run on a controller, processor-based device, a computer, a terminal, a network device, a mobile terminal, or a mobile communication enabled terminal.

According to a fifth aspect of the invention, a software tool is provided. The software tool comprises program portions for carrying out the operations of the aforementioned methods when the software tool is implemented in a computer program and/or executed.

According to a sixth aspect of the invention, a computer data signal embodied in a carrier wave and representing instructions is provided which when executed by a processor cause the steps of the method according to an aforementioned embodiment of the invention to be carried out.

According to a seventh aspect of the present invention, an apparatus operable as a transmitter for a cellular communication system is provided. The transmitter is operable with a multi-symbol modulator and allows for balanced multi-symbol modulation. The modulator is adapted to map predefined bit groups of one or more bits to modulation symbols. The bit groups define different bit positions for bits within the bit groups and the bit positions of the modulation symbols are associated with different error probability levels. Code blocks i, each on a code channel i (where i=1 to n) are provided, which code blocks include binary content to be modulated. The code blocks on the code channels are supplied to the modulator in that each code channel is associated with one predefined bit position of the bit groups. The bit groups are formed from the binary content of the code blocks in accordance with the code channel to bit position association defined above. A shuffling functionality is adapted to shuffle the binary content of at least two code blocks in accordance with predetermined shuffling rules such that substantially balanced error probability levels for the code channels is obtained.

According to an embodiment of the present invention, the shuffling functionality includes a sub-segmenting functionality, which is adapted to sub-segment said code blocks into a plurality of sub-segments; and a reordering functionality, which is adapted to reorder said sub-segments of said code blocks in accordance with a reordering algorithm before forming said bit groups.

According to an embodiment of the present invention, a hybrid automatic repeat request mechanism is employed for retransmissions of erroneous first transmissions. The reordering algorithm applied for a first transmission differs from the reordering algorithm applied for a first retransmission.

According to an embodiment of the present invention, the shuffling functionality includes one or more modified interleavers, which are adapted to interleave two or more code blocks on their code channels in common, in accordance with a first interleaving algorithm; and which are adapted to interleave said remaining code blocks on their code channels separately from each other in accordance with a common interleaving algorithm or with individual interleaving algorithms. The first interleaving algorithm and the common interleaving algorithm or the individual interleaving algorithms differ from each other.

According to an embodiment of the present invention, the modulator enables 8-array phase shift keying (8-PSK) modulation, which has 8 different modulation symbols, each of which is assigned to a predefined group of 3 bits; and/or binary (bi) phase shift keying (BPSK) modulation, which has two different modulation symbols, each of which is assigned to a predefined group of one bit.

According to an embodiment of the present invention, the apparatus is a portable device enabled for cellular communications over a wideband code division multiple access (WCDMA) system, and in particular with frequency division duplex (FDD).

According to an embodiment of the present invention, the apparatus is applicable for enhanced uplink packet access communications.

According to an eight aspect of the present invention, an apparatus, which is operable as a receiver for a cellular communication system is provided. The receiver is operable with a multi-symbol de-modulator and allows balanced multi-symbol de-modulation schemes. The de-modulator maps modulation symbols to predefined bit groups of one or more bits, which said bit groups define different bit positions for bits within said bit groups and the bit positions of said modulation symbols are associated with different error probability levels. Binary content to be de-modulated is received in form of a radio frequency signal, which is coded on the basis of modulation symbols. The radio frequency signal has been generated in accordance with balancing multi-symbol modulation schemes defined above. The de-modulation of the signal in accordance with the de-modulation schemes results in code blocks, each on a code channel. Each code channel is associated with one predefined bit position of said bit groups, which result from said de-modulation. The binary content of at least two code blocks is de-shuffled in accordance with predetermined de-shuffling rules such that substantially balanced error probability levels for said code channels are obtained.

According to a ninth aspect of the present invention, a system, which includes at least one of each of the aforementioned apparatuses, is provided.

BRIEF DESCRIPTION OF THE DRAWINGS

The present invention will be understood and appreciated more fully from the following detailed description, taken in conjunction with the drawings in which:

FIG. 1b illustrates schematically soft bit decisions in conjunction with the constellation diagram of FIG. 1a;

FIG. 1d illustrates schematically a multiplexing scheme of a transport channel with 3*BPSK modulation;

FIG. 1e illustrates schematically a multiplexing scheme of a transport channel with 8-PSK modulation;

FIG. 4 illustrates schematically a multiplexing scheme of a transport channel with 8-PSK modulation and BPSK modulation;

FIG. 5a illustrates schematically an enhanced multiplexing scheme of a transport channel with reordering operation before 8-PSK and BPSK modulation according to an embodiment of the present invention;

FIG. 8c illustrates a part of exemplary reorder patterns applicable with the transport channel processing illustrated in FIG. 8a.

DETAILED DESCRIPTION

Figure 1A:
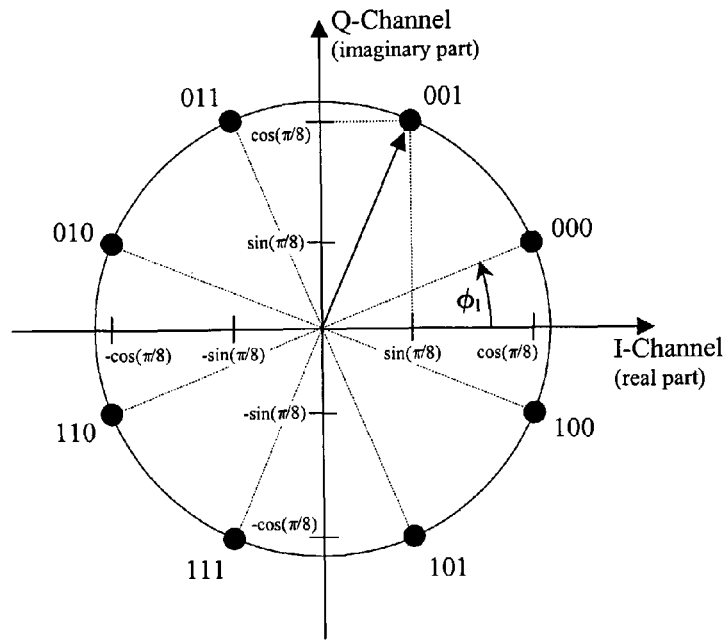
FIG. 1a illustrates schematically a constellation diagram of 8-level PSK Q-I/code modulation.
Figure 1B:
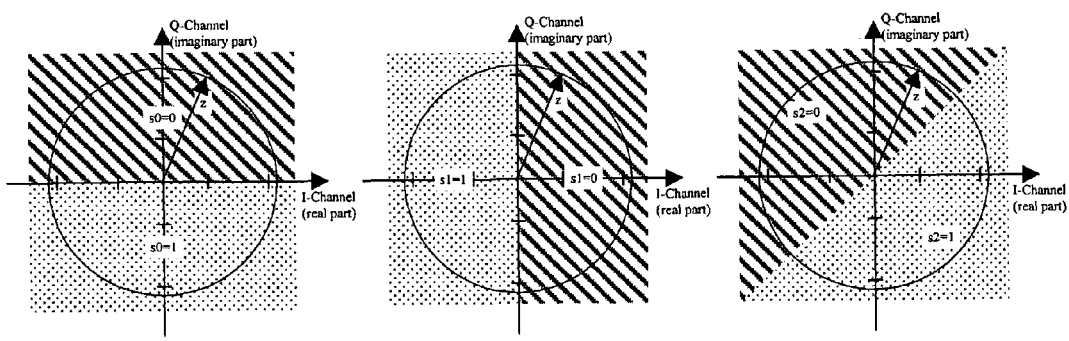
Figure 1C:
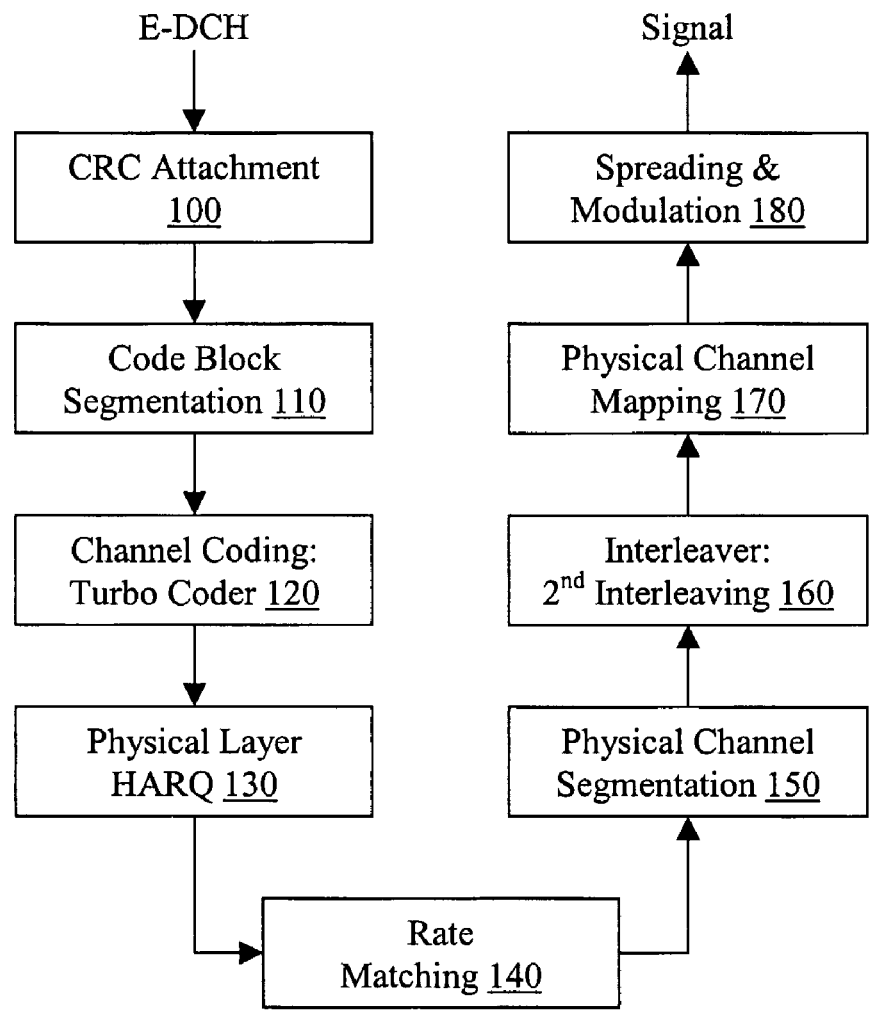
FIG. 1c illustrates schematically an operation sequence scheme for transport channel processing for a separate enhanced dedicated channel (DCH) coded composite transport channel (CCtrCH) in accordance with the current 3GPP standardization approach.

With reference to FIG. 1c currently proposed transport channel processing for an enhanced dedicated channel for enhanced uplink packet access (EUPA) as currently discussed by the 3GPP (refer to the Technical Specification Group Radio Access Network; FDD Enhanced Uplink; Physical Layer Aspects (Release 6); TS 25.808, Version 0.0.3 dated July 2004) shall be introduced briefly. The enhanced dedicated channel carrying the data for being transmitted using the enhanced uplink packet access service to a base station also designated in the 3GPP specifications as Node B.

FIG. 1c illustrates the processing structure for E-DCH transport channel, which is mapped onto a separate CCTrCH. Data arrives to the transport channel structure in form of one transport block once per transmission time interval (TTI). Next, a CRC (cyclic redundancy check) is added by a CRC attachment 100 to the transport block. The CRC serves to enable detection of errors in E-DCH decoding at Node B. The CRC length to be added to the transport block can have different distinct bit lengths, conventionally including 0, 8, 12, 16, and 24 bits, respectively. The more bits the CRC of the transport block contains, the lower is the probability of an undetected error in the transport block in the receiver (Node B). With respect to the aimed enhanced transmission rates of the enhanced uplink data access, the use of 24 bits for CRC is recommended. The physical layer provides the transport block to higher layers together with an error indication obtained from the CRC check. After CRC attachment 100, the transport blocks are formed into different coding blocks by code block segmentation 110. In detail, the if the number of bits in a TTI is larger than Z, which defines the maximum size of a code block in question, then code block segmentation is performed. The maximum size of the code blocks depends on the kind of channel coding, which represents the next transport channel processing operation. In accordance with the illustrated example shown in FIG. 1c, a turbo coder 120 should be employed for channel coding. Hence, Z, the maximum size of a code block in question, shall be predefined as Z=5114.

In a following operation hybrid automatic repeat request (HARQ) functionality 130 is implemented. HARQ schemes combine ARQ protocols with forward correction codes (FEC) to provide increased throughput in packet transmissions. Typically, HARQ schemes are classified as Type I, Type II, and Type III Hybrid ARQ schemes depending on the level of complexity employed in the implementation. In particular, in Type I Hybrid ARQ erroneous packets are discarded on detection of a decoding error and a retransmission request is send to the transmitter. The entire packet is retransmitted on receipt of the corresponding non-acknowledgement (NACK) signaling. The packets are combined based on either the weighted SNR of individual bits or soft energy values, in which case the technique is termed Chase combining. In Type II Hybrid ARQ retransmission requests consist only of parity bits. The receiver combines additional parity bits from retransmission with bits of the first transmission resulting in lower rates before FEC decoding is attempted. In Type III Hybrid ARQ individually transmitted packets are self-decodable and each packet differs in coded bits from the previous transmission. Packets are only combined after decoding has been attempted on the individual packets.

Subsequent to the hybrid automatic repeat request (HARQ) functionality 130, rate matching 140 is employed to match the number of bits to be transmitted to the number available on a single frame or, alternatively, to match the CCTrCH bit rate to the physical channel (PhCH) bit rate. This can be achieved by puncturing or by repetition. The bit rate of the PhCH(s) is limited by the transmitter capability and restrictions imposed by the employed radio access network (RAN), through limitations on the spreading factors applicable with the PhCH(s). The rate matching is in principle a dynamic operation with the aim to use all symbols available in the radio frame. Further, rate matching 140 can be adjusted by parameters and attributes to tune the quality of different services.

Physical channel segmentation 150 enables to use more than one physical channel for transmission. The physical channel segmentation 150 can be achieved by simply dividing the data on the spreading codes of the physical channels. The division of the data can be performed evenly in case the spreading factors of the physical channels are the same; otherwise the division has to consider the different spreading factors at the physical channel segmentation 150.

The interleaver 160 performs a second ($2^{nd}$) interleaving on the radio frame, which is also known as intra-frame interleaving. The $2^{nd}$ interleaving is a block interleaving with inter-column permutations applied to the column of the interleaver. The second interleaver is conventionally applied separately for each physical channel. The intra-frame interleaving addresses the problem of burst errors occurring during longer and deeper fading periods during transmission. In such cases the physical radio frequency channel does not behave as a symmetric independent physical radio frequency channel, rather the bit errors have a statistic dependency, which reduces the capability of error correction. Successful and well-form error correction requires radio frequency channels without memory and, consequently, with statistically independent bit errors. In order to prevent such burst errors, which indeed occur frequently on physical radio frequency channels, the code words transmitted on the physical radio frequency channels should be distributed essentially uniformly.

The output of the interleaver 160 is subsequently mapped on the physical channels by the physical channel mapping 170. Finally, spreading and modulation 180 are applied onto the physical channels supplied with data in accordance with the transport channel processing described above.

With reference to FIG. 1d and 1e, the transport channel processing illustrated above is illustrated in view of several code blocks supplied to 3*BPSK (binary phase shift keying) and 8-PSK (8-level or 8-array phase shift keying) modulation, respectively.

Referring firstly to FIG. 1d, the channel coding 120 results in turbo blocks 1 to 3, which shall represent illustratively the code blocks caused by the channel coding 120 implemented as a turbo coding or turbo coder with a code rate 1/3. The physical channel segmentation divides the turbo blocks 1 to 3 onto code channels 1 to 3, The number of code channels is caused by the selected modulation, i.e. the 3*BPSK, which denotes three separate transport channels, each of which supplied to a BPSK modulation. The BPSK modulation, which abbreviates binary phase shift keying modulation, represents a phase modulation with two symbols, one of which associated with binary 0 and the other one associated with binary I. Subsequently, the 2 interleaver 160 and the 2nd interleaving are independently applied onto the code blocks of each code channel 1 to 3, respectively. Next, the interleaved code blocks of the code channels 1 to 3 are separately supplied to the BPSK modulation or BPSK symbol mapping. The illustration of FIG. 1d represents substantially the transport channel processing for uplink data transmission in FDD domain as proposed by the UTRAN specification.

Referring to FIG. 1e, the transport channel coding processing as illustrated with reference to FIG. 1d may be simplify adapted to the 8-PSK modulation by substituting the three separate BPSK modulations or BPSK symbol mappings, respectively, with a 8-PSK modulation and 8-PSK symbol mapping, respectively. In detail, the channel coding 120 results in turbo blocks 1 to 3, which are divided onto S0, S1 and S2 channels, onto the code blocks of which the $2^{nd}$ interleaver is applied individually and independently for each code block of each S0, S1, and S2 channel. In accordance with the 8-PSK functionality described in detail above, the code block of the S0 channel is supposed to supply the s0-bits of the 3-bit group to the 8-PSK modulation. Correspondingly, the code block of the S1 channel is supposed to supply the s1-bits and the code block of the S2 channel is supposed to supply the s2-bits of the 3-bit group to the 8-PSK modulation. Subsequently, the 8-PSK modulation or 8-PSK symbol mapping forms 8-PSK symbols from the code blocks on the S0 to S2 channels.

The illustration of FIG. 1e illustrates the straight forward adaptation of the transport channel processing according to the state of the art in the domain of UTRAN FDD to the employment of 8-PSK modulation for increased data throughput. Nevertheless, the straight forward adaptation implies the disadvantage that the code blocks of the S0 to S2 channels resulting from the de-modulation or re-mapping of the 8-PSK symbols in accordance with the 8-PSK constellation have different levels of error probability caused by the different levels of error probability of the s0, s1 and s2 bits of the 3-bit group as stated above in detail.

It should be understood that the description above represents shows an outline of the implementation of the transport channel processing. However, the illustrated outline enables those skilled in the art to appreciate the inventive concept, which will be described with references back to the illustrated transport channel processing operations and modules.

In order to overcome the unbalanced levels of error probability, which are obtained by straight forward adaptation of the transport channel processing for uplink data transmission employing n*BPSK modulation or 8-PSK modulation, the present invention proposes a balancing of the error probability levels of the code blocks being subjected to modulation schemes with unbalanced error probability levels. In accordance with the present invention, the balancing is obtainable by shuffling or distributable re-arranging of bit arrangement considering several code blocks.

In accordance with a first embodiment of the invention, the shuffled bit arrangement to obtain balanced error probability errors is achieved by a shuffling processing functionality 166, which can be assumed as being implemented in conjunction with the $2^{nd}$ interleaver 160. The shuffling functionality 166 may be performed before or after $2^{nd}$ interleaving of the bode blocks on the code channels.

Figure 2A:
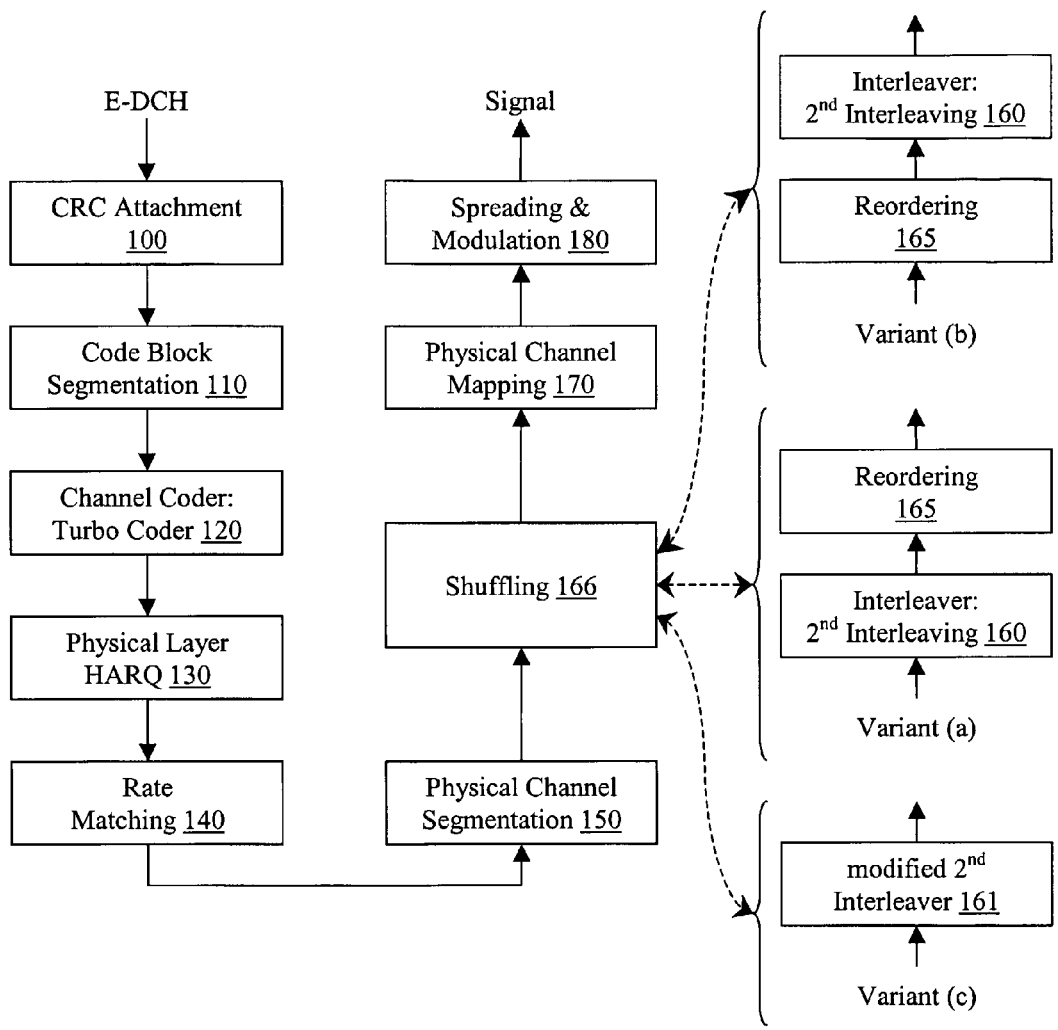
FIG. 2a illustrates schematically an operation sequence scheme for transport channel processing for a separate enhanced dedicated channel (DCH) coded composite transport channel (CCtrCH) on transmitter-side according to an embodiment of the present invention.

FIG. 2a illustrates schematically an operation sequence scheme for transport channel processing for a separate enhanced dedicated channel (E-DCH) coded composite transport channel (CCtrCH) on transmitter-side according to an embodiment of the present invention. The transmitter-side is herein a portable device capable for mobile communications. The operation sequence and the operation modules for transport channel processing according to an embodiment of the present invention corresponds substantially to that illustrated in Fig. 1c and described with reference thereto. As aforementioned, the modification of the bit arrangement is achieved by including the supplementary shuffling functionality 166. Different embodiments of the shuffling functionality 166, designated as variants (a) to (c) are included. In particular, the following embodiments will illustrate two slightly different solutions, one operating supplementary to the $2^{nd}$ interleaving, which corresponds to variants (a) and (b), and the other one being based on a modified $2^{nd}$ interleaving 161, which corresponds to variant (c).

With reference to the operation supplementary to the $2^{nd}$ interleaving the shuffling operation will be designated as reordering and the shuffling functionality is correspondingly adapted to the wording reorder functionality 166. With reference to variant (c) the modified $2^{nd}$ interleaver 161 represents a new interleaver having new properties and implementing the required interleaver functionality. Nevertheless, it shall be noted that both slightly different solutions are based in principle on shuffle operation introduced above.

The shuffling functionality may be operated as the separate reorder functionality 166 (before or after $2^{nd}$ interleaving) or may be integrated with the $2^{nd}$ interleaver forming a modified $2^{nd}$ interleaving functionality or modified $2^{nd}$ interleaver 161.

In principle, the shuffling functionality 166 should be arranged after the physical channel segmentation 150, which results in the three code channels required for 8-PSK modulation. After modulation and spreading the data of the code blocks are transmitted in form of radio frequency signals to the receiver, which is herein the base station or Node B.

Figure 2B:
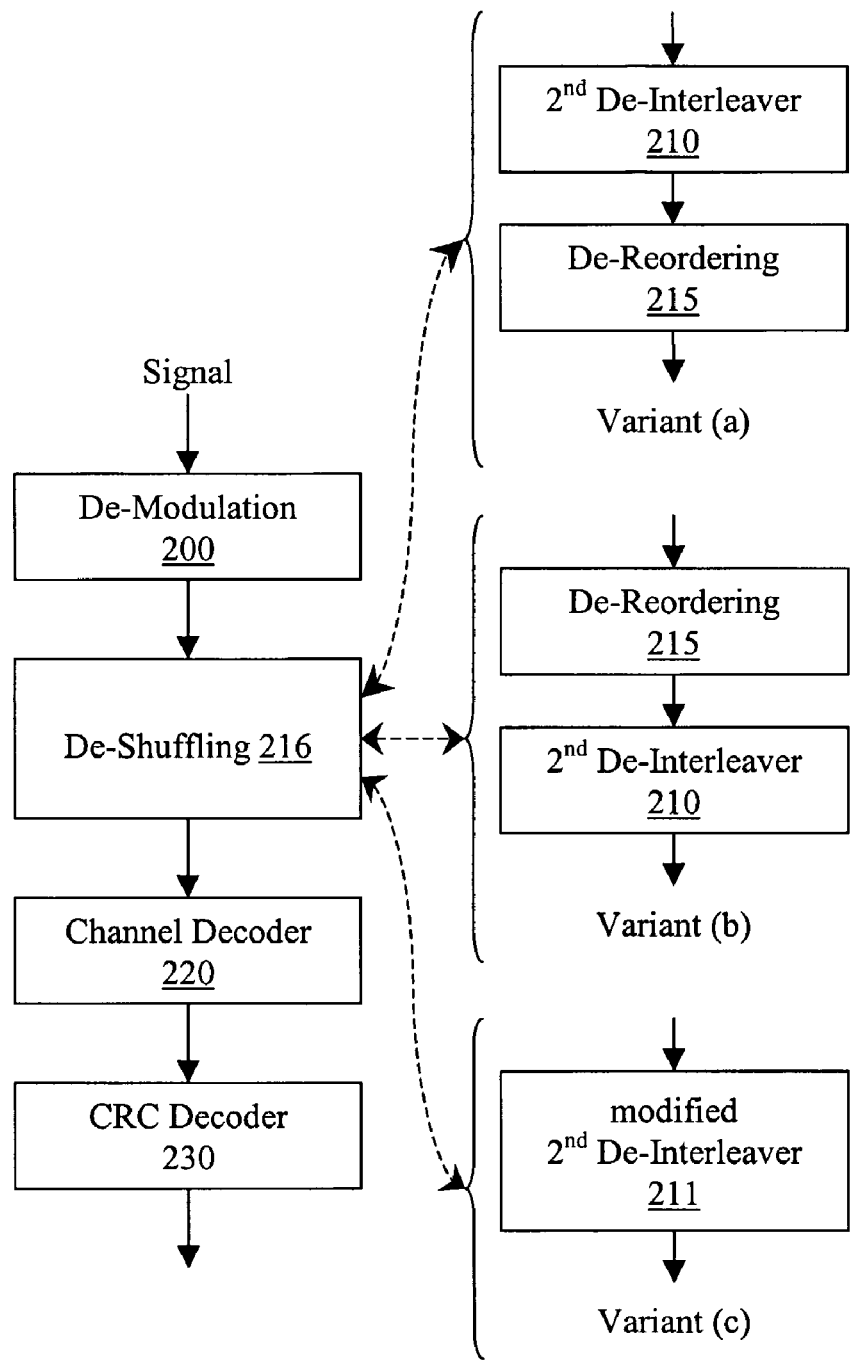
FIG. 2b illustrates schematically an operation sequence scheme for transport channel processing for a separate enhanced dedicated channel (DCH) coded composite transport channel (CCtrCH) on receiver-side according to an embodiment of the present invention.

FIG. 2b illustrates schematically a corresponding operation sequence scheme for transport channel processing on receiver-side according to an embodiment of the present invention. After receiving of the radio frequency signals, the signals are de-spread and de-modulated by the despreading and de-modulation 200 resulting in code blocks. Next, a de-shuffling functionality 216 is applied to de-shuffle the code blocks. Then, a channel decoder 220, i.e. the turbo decoder, is applied and finally, a CRC decoder 230 checks whether the decoding was successful or not.

In accordance with the variants (a) to (c) described with reference to FIG. 2a, corresponding variants (a) to (c) are illustrated herein. Referring to variants (a) and (b), the de-shuffling functionality 216 can be implemented in form of an arrangement of a de-reordering functionality 215, which is arranged after or before the $2^{nd}$ de-interleaver 210.

Alternatively referring to variant (c), the de-shuffling functionality 216 may be integrated with de-interleaving functionality forming the modified $2^{nd}$ de-interleaver 211.

As described above, the inventive concept of the present invention is based on a shuffling and de-shuffling of bits or segments of bits contained within several code blocks among all these code blocks. Those skilled in the art will appreciate on the basis of the embodiments illustrated in FIGS. 2a and 2b that the shuffle functionality is operated in accordance with corresponding pre-defined and well-defined shuffle rules and algorithms, which have corresponding solutions of the inverse problem. This means, each shuffle rule and algorithm applicable for shuffling has a corresponding inverse representation which enables to return to the original bit or segment arrangement before shuffling. The inverse representations will be designated de-shuffle rule and algorithms, respectively, and the inverse operation will be designated as de-shuffling.

It should be noted that corresponding assumptions should be taken in view of the reordering and modified $2^{nd}$ interleaving. These operations have also to be invertible, in order to enable a de-reordering and a modified $2^{nd}$ de-interleaving, respectively. The corresponding rules and algorithms will be designated reordering/interleaving rules, algorithms as well as patterns and de-reordering/de-interleaving rules, algorithms as well as patterns, respectively.

Figure 3B:
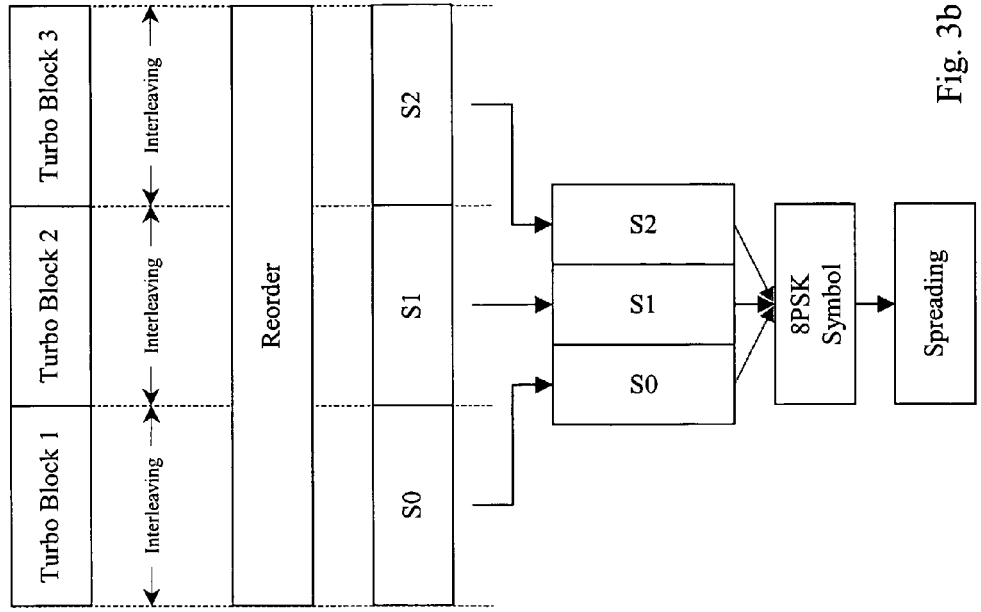
FIG. 3b illustrates schematically an enhanced multiplexing scheme of a transport channel with reordering operation before 8-PSK modulation according to another embodiment of the present invention.
Figure 3A:
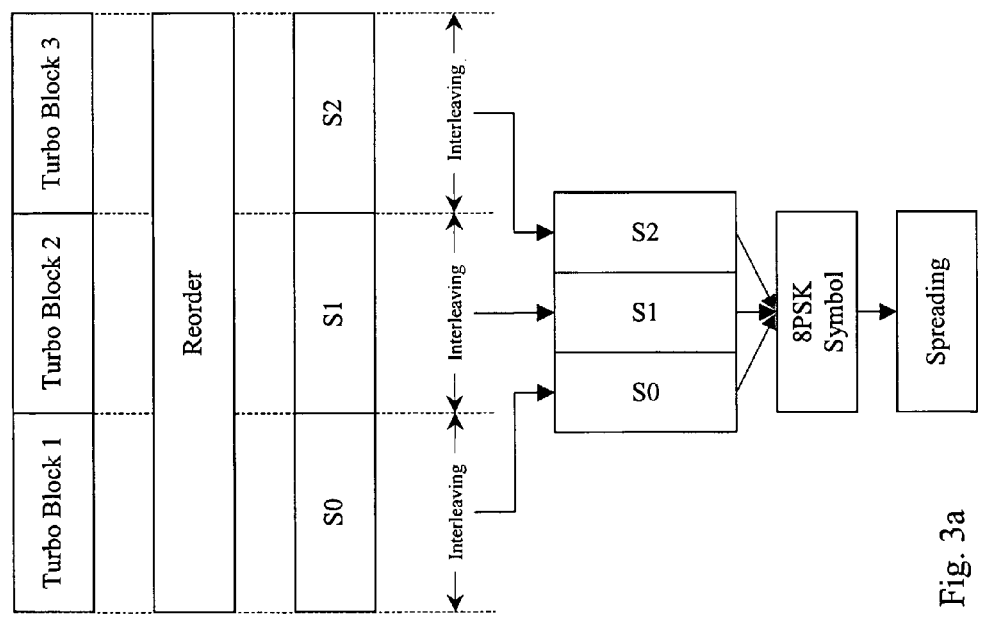
FIG. 3a illustrates schematically an enhanced multiplexing scheme of a transport channel with reordering operation before 8-PSK modulation according to an embodiment of the present invention.

With reference to FIGS. 3a and 3b, the transport channel coding processing according to embodiments of the invention and in accordance with FIG. 2a is illustrated. In common to the FIGS. 3a and 3b, it shall be assumed that turbo blocks 1 to 3 are obtained from turbo coding 120 and physical channel segmentation 150.

Referring to FIG. 3a, the bits of the turbo blocks 1 to 3 are reordered among all three turbo block forming finally code blocks of code channels S0 to S2. The aim of the reordering functionality of the bits is to scatter or distribute the bits of each turbo code block substantially evenly upon the final code blocks of code channels S0 to S2. The scattering or distributing functionality prevents the aforementioned problem that conventionally all bits of a code block of a code channel are mapped into one bit position of the 3-bit groups corresponding to the 8-PSK symbols.

After reordering of the bits of the turbo blocks 1 to 3 to code blocks on the code channels S0 to S2, the code blocks of the code channels S0 to S2 are subjected to the $2^{nd}$ interleaving, which is applied separately on each code block of the code channels S0 to S2 and independently from each other code channel. Finally, the resulting code blocks of the code channels S0 to S2 are supplied to the 8-PSK symbol mapping (modulation), where the bits of the code block of code channel S0 serves for the bits in s0-position in the 3-bit groups, the bits of code block of code channel S1 serves for the bits in s1-position, and the bits of the code block of code channel S2 serves for the bits in s2-position in the 3-bit groups.

Referring to FIG. 3b, the transport channel processing according to the embodiment illustrated in FIG. 3b differs from the embodiment illustrated in FIG. 3a therein that the reordering functionality is arranged subsequently to the $2^{nd}$ interleaving. This means, the turbo blocks 1 to 3 are obtained from turbo coding 120 and physical channel segmentation 150 and subjected to the $2^{nd}$ interleaver 160, which forms interleaved turbo blocks 1 to 3. The $2^{nd}$ interleaving is applied separately and independently. The reordering functionality scatters or distributes the bits of each interleaved turbo code block substantially evenly upon the final code blocks of code channels S0 to S2. Subsequently, the resulting code blocks of the code channels S0 to S2 are supplied to the 8-PSK symbol mapping (modulation), where the bits of the code block of code channel S0 serves for the bits in s0-position in the 3-bit groups, the bits of code block of code channel S1 serves for the bits in s1-position, and the bits of the code block of code channel S2 serves for the bits in s2-position in the 3-bit groups.

Figure 3C:
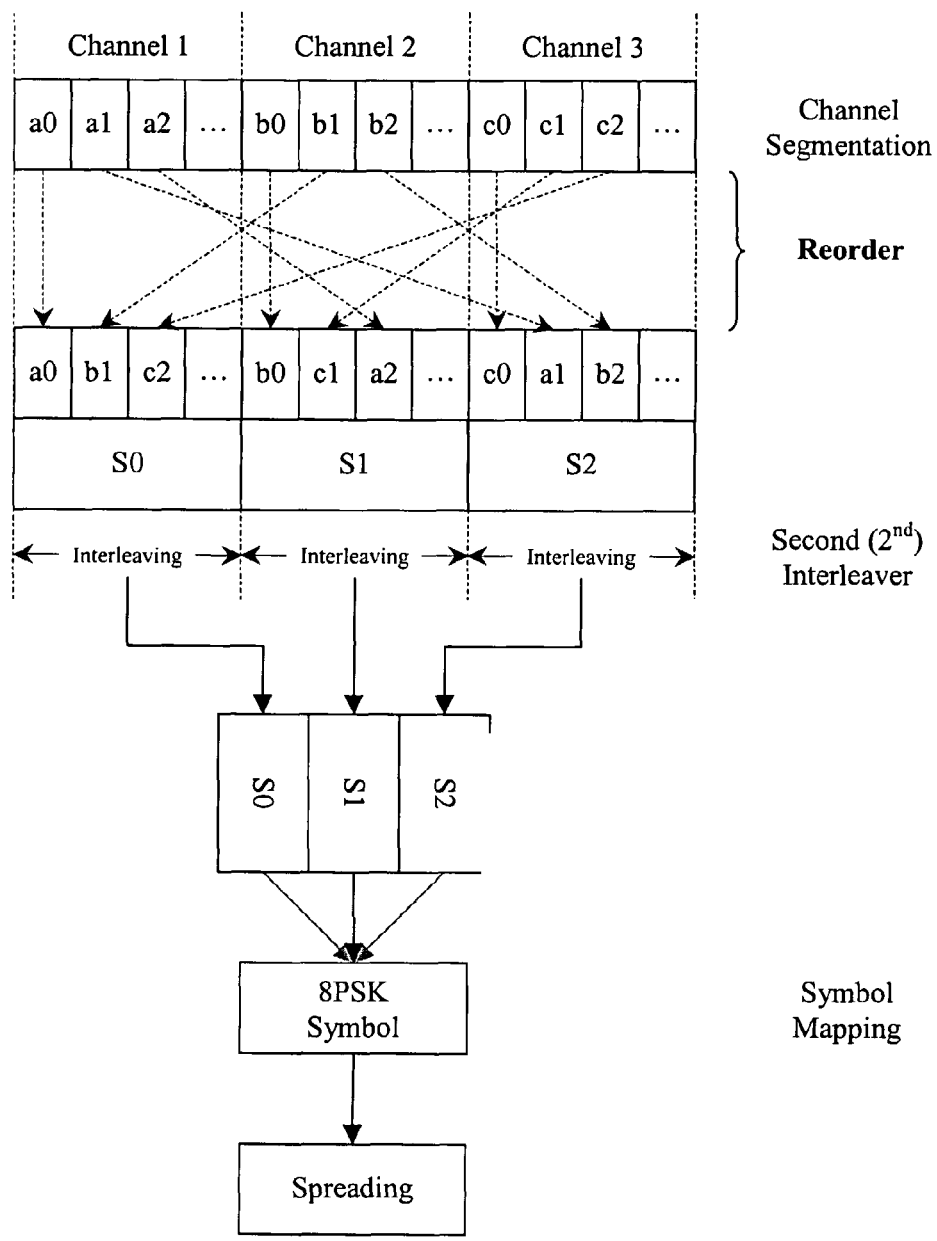
FIG. 3c illustrates schematically reordering processing operation in accordance with FIG. 3a and according to a specific embodiment of the present invention.

With reference to FIG. 3c, a specific embodiment of the reordering functionality is illustrated. The transport channel processing shown in FIG. 3c corresponds substantially to the transport channel processing described with reference to FIG. 3a. The specific embodiment of the reordering functionality provides for a sub-segmentation of the turbo blocks 1 to 3, which are provided on code channels 1 to 3. The number of sub-segments in each channel is advantageously dividable by 3 corresponding to the resulting number of three code channels S0 to S2. The sub-segments are distributed substantially evenly among the code channels S0 to S2 such that the resulting code channels S0 to S2 each comprises the same amount of sub-segments (or bits or data) as the code blocks of the original code channels 1 to 3. Numerous algorithms can be applied to enable the even distribution of the sub-segments. Preferably, permutation algorithms are applicable for reordering of the sub-segments formed of the code blocks on the channels 1 to 3.

In summary, it should be noted that the unbalanced error probability levels of the different bit position of the 3-bit groups corresponding to 8-PSK symbols can not be overcome by any processing operation. The reordering functionality according to an embodiment of the invention balances the error probability levels of the code channel S0 to S2 by scattering and distributing the bits of the code blocks on the code channel S0 to S2, where the different code blocks of the code channel S0 to S2 each provides bits for one bit position of the 3-bit groups to be mapped to 8-PSK symbols. Consequently, after de-reordering representing the inverse functionality to the reordering functionality the different error probability levels of the different bit positions within the 3-bit groups of the 8-PSK symbols are distributed onto the code channels obtained from the de-reordering functionality. This means, the code blocks of the code channels resulting from the de-reordering has effectively the same error probability level. This balancing of the error probability levels will also be designated as quasi-balancing of the error probability levels.

The reorder functionality should be also denoted as intra-reordering functionality, which indicates that the reordering functionality may comprise several code blocks on several code channels.

With reference to FIG. 4, it shall be indicated that the proposed reordering functionality according to an embodiment of the invention is not limited to the transport channel processing such as illustrated in FIGS. 3a to 3c. FIG. 4 illustrates a transport channel processing which employs both 8-PSK modulation and BPSK modulation. Consequently, the coded bits obtained from the channel coding 120 (such as the turbo coding) is divided into four code channels 1 to 4, wherein three of the code channels 1 to 4 are dedicated to the 8-PSK modulation and one code channel is provided for the BPSK modulation. The straight forward implementation of the 8-PSK modulation is illustrated in FIG. 4. This means, the three code channels S0 to S2 are obtained for example from the code channels 1 to 3 and the BPSK code channel is obtained from the remaining code channel 4. The $2^{nd}$ interleaver is applied separately and independently on each code block of the code channels S0 to S2 and BPSK. Next, the code blocks of the code channels S0 to S2 are supplied to the 8-PSK symbol mapping (modulation) and the code block of the code channel BPSK is supplied to the BPSK symbol mapping (modulation). The bits of the code block of code channel S0 serves for the bits in s0-position in the 3-bit groups, the bits of code block of code channel S1 serves for the bits in s1-position, and the bits of the code block of code channel S2 serves for the bits in s2-position in the 3-bit groups.

Those skilled in the art will appreciate on the basis of the detailed description above that the code blocks resulting after de-modulation (8-PSK de-modulation and BPSK de-modulation) have different error probability levels, wherein the error probability levels of code blocks resulting from the 8-PSK de-modulation differ from each other and differ additionally from the error probability level of the code block obtained from BPSK de-modulation. Such unbalanced error probability levels reduce significantly the overall throughput of the transmission and have to be prevented.

Figure 5B:
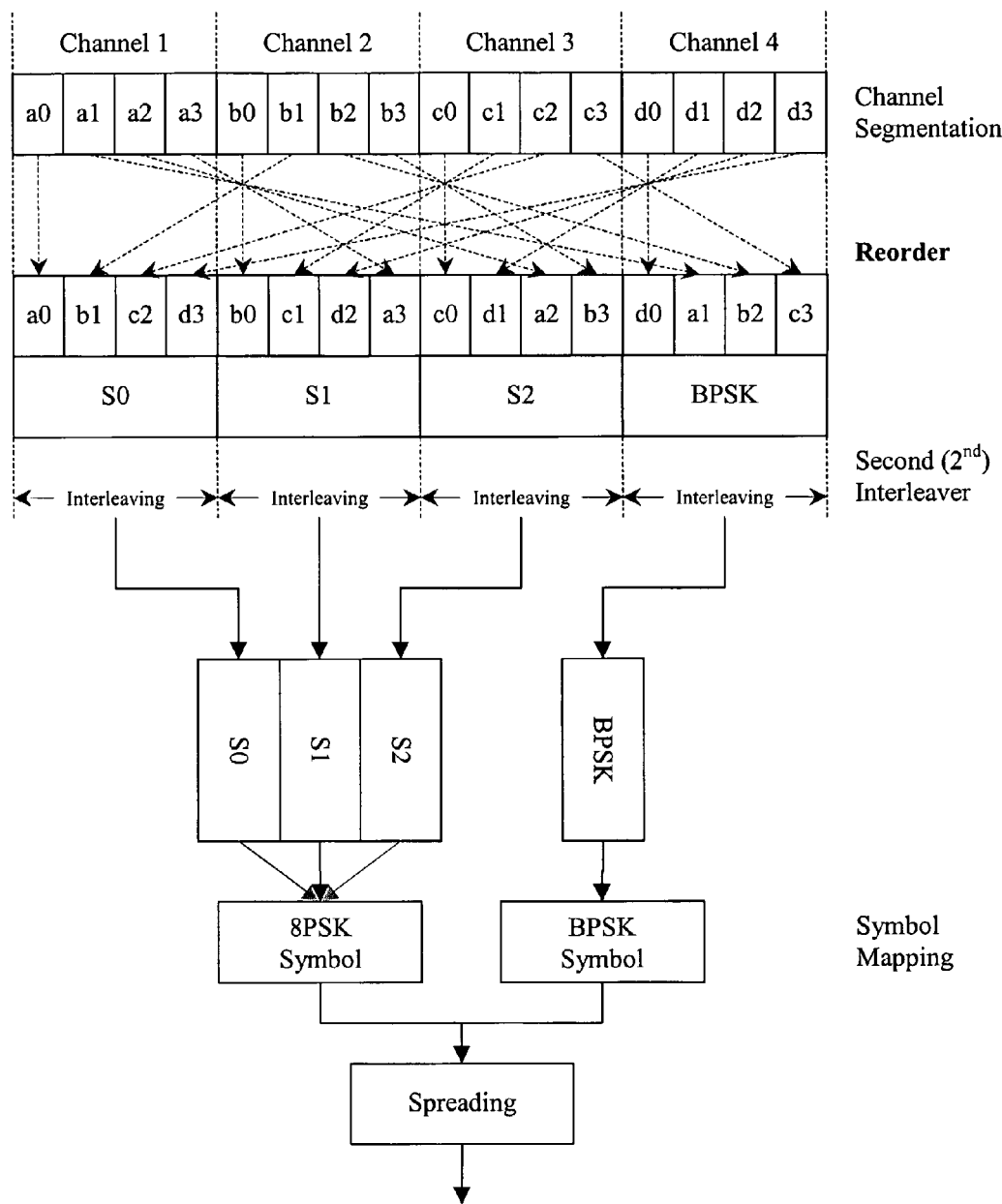
FIG. 5b illustrates schematically reordering processing operation in accordance with FIG. 5a and according to a specific embodiment of the present invention.

According to another embodiment of the present invention, the reordering functionality operating as an intra-reordering functionality can be expanded to comprise four code channels, among which the bits of the four channels are substantially evenly distributable. With reference to FIG. 5a, such a reordering functionality covering four code channels (and code blocks, respectively) is schematically illustrated. FIG. 5b illustrates a specific embodiment of the reordering functionality covering four code channels, where the reordering functionality is based on a cyclic permutation algorithm.

Referring to FIG. 5a, it shall be assumed that coded bits are obtained from turbo coding 120. Next, the physical channel segmentation 150 divides the coded bits into code blocks on the code channels 1 to 4. The aim of the reordering functionality of the bits is to scatter or distribute the bits of each code block on the code channels 1 to 4 substantially evenly upon the final code blocks on the code channels S0 to S2 and BPSK. After reordering the code blocks of the code channels S0 to S2 and BPSK are subjected to the $2^{nd}$ interleaving, which is applied separately on each code block of the code channels S0 to S2 and BPSK and independently from each other code channel. Finally, the resulting code blocks of the code channels S0 to S2 are supplied to the 8-PSK symbol mapping (modulation) and the code block of the code channel BPSK is supplied to the BPSK symbol mapping (modulation). The bits of the code block of code channel S0 serves for the bits in s0-position in the 3-bit groups, the bits of code block of code channel S1 serves for the bits in s1-position, and the bits of the code block of code channel S2 serves for the bits in s2-position in the 3-bit groups.

Those skilled in the art will appreciate on the basis of the detailed description above that the code blocks obtained from de-modulation (8-PSK de-modulation and BPSK de-modulation) have different error probability levels. But after de-reordering of the code blocks obtained from de-modulation the different probability levels in accordance with the employed modulation and the bit position is balanced due to the distribution of the bits among the code blocks by the de-reordering functionality. Consequently balanced error probability levels can be also obtained when employing different modulation techniques.

A specific embodiment of the or-ordering functionality illustrated above with reference to FIG. 5a is illustrated in detail with reference to FIG. 5b. The description referring to FIG. 5b will be limited to the specific embodiment of the or-ordering functionality. The specific embodiment of the reordering functionality provides for a sub-segmentation of the code blocks on the code channels 1 to 4. The number of sub-segments in each channel is advantageously dividable by 4 corresponding to the resulting number of three code channels S0 to S2 for 8-PSK modulation and one code channel BPSK for BPSK modulation. The sub-segments are distributed substantially evenly among the code channels S0 to S2 and BPSK such that the resulting code channels S0 to S2 and BPSK each comprises the same amount of sub-segments (or bits or data) as the code blocks of the original code channels 1 to 4. Numerous algorithms can be applied to enable the even distribution of the sub-segments. Preferably, permutation algorithms are applicable for reordering of the sub-segments formed of the code blocks on the code channels 1 to 4. The illustrated or-ordering functionality can be understood as a cyclic permutation algorithm.

It should be understood that the reordering functionality performed before $2^{nd}$ interleaving is one embodiment of the present invention. The reordering functionality as illustrated in FIGS. 3c, 5a and 5b and described with reference thereto can also be performed after $2^{nd}$ interleaving causing the same effect of balancing the error probability levels within one modulation technique or between several different modulation techniques.

Figure 6:
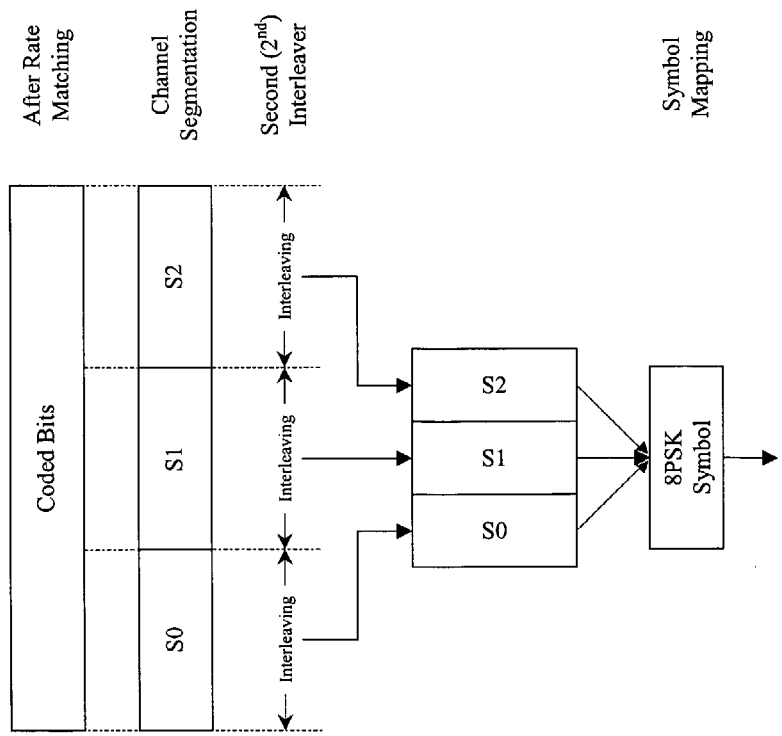
FIG. 6 illustrates schematically a multiplexing scheme of a transport channel with 8-PSK modulation.

With reference to FIG. 6, the concept of the invention to quasi-balance error probability levels occurring from one or more modulation techniques employed for transmission should be focused on an alternative embodiment addressing the $2^{nd}$ interleaver. As stated above, the interleaver is always used in wireless communication to reduce impacts of burst errors caused by physical channels with memory such as deep fading over a long period of time. In 3GPP Release 99 interleaver schemes for BPSK and 3*BPSK modulation have been specified. For BPSK there is proposed one inter-frame interleaver, which is designated above as $2^{nd}$ interleaver. For 3*BPSK, illustrated exemplarily in FIG. 1d, the same inter-frame interleaver, i.e. $2^{nd}$ interleaver, as that for 10 BPSK is specified. However, 3*BPSK requires three inter-frame interleavers ($2^{nd}$ interleavers) for each code channel required for 3*BPSK, where each of the inter-frame interleavers operates separately and independently on each orthogonal variable spreading factor (OVSF) code channel. In accordance with the present invention, 8-PSK modulation is in particular proposed having advantages over 3*BPSK modulation for enhanced uplink packet access. Especially, 8-PSK modulation has an advantageously lower peak to average ratio (PAR). One consideration is that in 8-PSK scheme there exists only one OVSF, which implies that the employing of inter-frame interleaving just as that for 3*BPSK modulation seems not to be feasible. Another straight choice would lead to the inter-frame interleaving just as that fro BPSK, i.e. one inter-frame interleaver ($2^{nd}$ interleaver) for all bits in one code block (and one TTI, respectively). However, the significant differences between 8-PSK and BPSK modulations have been shown above. Especially, the different error probability levels of the bit positions in the 3-bit groups corresponding to the 8-PSK symbols have to be considered. Consequently, these considerations indicate that the inter-frame interleaver ($2^{nd}$ interleaver) specified for BPSK or 3*BPSK modulation would not be the best choice for application with 8-PSK modulation.

The FIG. 6 illustrates exemplarily a transport channel processing scheme, where the inter-frame interleavers correspond to those specified for 3*BPSK modulation. It should be assumed that the coded bits result for the channel coder 120 preferably performing turbo coding with code rate 1/3. The physical channel segmentation 150 divides the coded bits onto code channels S1 to S2. The number of code channels results from the selected modulation, i.e. the 8-PSK modulation, which denotes three separate transport channels, each of which supplied to one pit position of the 3-bit group to form 8-PSK symbols. Before modulation and symbol mapping, respectively, the 2nd interleaver (inter-frame interleaver) 160 corresponding to the inter-frame interleaver specified for BPSK/3*BPSK modulation is applied onto the code blocks of each code channel S0 to S2. Next, the interleaved code blocks of the code channels S0 to S2 are supplied to the 8-PSK modulation. The bits of the code block of code channel S0 serves for the bits in s0-position in the 3-bit groups, the bits of code block of code channel S1 serves for the bits in s1-position, and the bits of the code block of code channel S2 serves for the bits in s2-position in the 3-bit groups.

Figure 7:
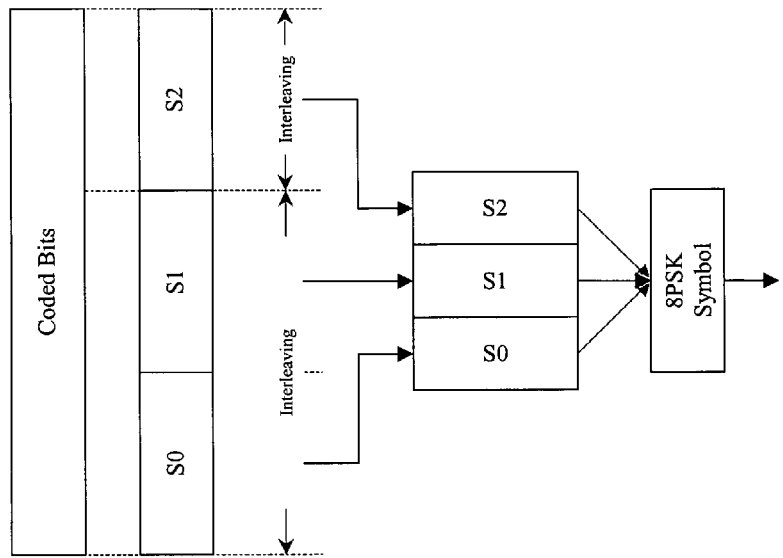
FIG. 7 illustrates schematically an enhanced multiplexing scheme of a transport channel with improved interleaving operation before 8-PSK modulation according to another embodiment of the present invention

With reference to FIG. 7, an enhanced or modified $2^{nd}$ interleaver 211 is proposed according to an embodiment of the present invention. As aforementioned, it can be conducted that the s2 bit position, which represents the position of the least significant bit (LSB) within the 3-bit group, is always associated with a higher level of error probability in comparison with the remaining bit positions. Consequently, different modified $2^{nd}$ interleavers are proposed or being employed with 8-PSK modulation. In particular, the different modified $2^{nd}$ interleavers are adapted to balance the differences in the error probability levels being intrinsic for the 8-PSK modulation. More particular, the processing scheme illustrated in FIG. 7 proposes to use two different modified $2^{nd}$ interleavers, one of which interleaving the bits of the code blocks on the channels S0 and S1, and the other one interleaving the bits of the code block on the channel S2. It shall be noted that the modified $2^{nd}$ interleaver interleaving the bits of the code blocks on the channels S0 and S1 may not be designated as inter-frame interleaver any more. Rather, the modified $2^{nd}$ interleaver covering the code blocks on the channels S0 and S1 represents an intra-frame interleaver. Moreover, those skilled in the art will appreciate that the interleaver scheme has principally a certain similarity with the reorder functionality, which performs for instance a permutation on sub-segments of code blocks on code channels, where each of the sub-segments can comprise one or more bits.

The use of different modified $2^{nd}$ interleavers, one covering the code channels S0 and S1 and the other one covering the code channel S2, enables to quasi-balance the unbalanced 8-PSK error probability levels associated with the pit positions in the 3-bit groups corresponding to the 8-PSK symbols. Numerous interleaving schemes with predefined interleaving rules or algorithms are applicable to obtain the aforementioned quasi-balancing functionality.

In accordance to a further embodiment of the present invention, the reordering functionality according to an embodiment of the invention shall be discussed in view of the use of Hybrid ARQ techniques for enhanced uplink packet access. Physical (layer 1) Hybrid ARQ represents a potential technique to enhance the overall transmission capacity. In particular, Type I Hybrid ARQ with Chase combining and Type III Hybrid ARQ with full incremental redundancy can improve significantly the capacity and cell range when compared with conventional ARQ techniques. As stated above briefly, in Type I Hybrid ARQ with Chase combining, the retransmission packets carry identical symbols compared with the original packets having been received erroneous to initiate retransmission. The original packets are combined with the retransmission packets in the receiver. From energy point of view, the combined packets have a better signal-to-noise ratio as the original packets, which improved the decodability. As described above in detail, the unbalanced error probability levels of the 8-PSK modulation can be overcome by quasi-balancing including reordering of sub-segments of code blocks on code channels. However, the quasi-balancing relates to a statistical point of view. This means, the code blocks transmitted on a code channel are balanced (in their error probability levels) after de-reordering, but the bits at different bit positions of the 3-bit symbol have still different error probability levels.

Referring back to the transport channel processing with reorder functionality shown in FIG. 5a according to an embodiment of the present invention, it shall be assumed that coded bits are obtained from the turbo coder 120. Next, the physical channel segmentation 150 is applied to divide the coded bits into code blocks on the code channels 1 to 4. The aim of the reordering functionality of the bits is to scatter or distribute the bits of the code blocks on the code channels 1 to 4 substantially evenly upon the final code blocks on the code channels S0 to S2 and BPSK. After reordering the code blocks of the code channels S0 to S2 and BPSK are subjected to the 2nd interleaving, which is applied separately on each code block of the code channels S0 to S2 and BPSK and independently from each other code channel. Finally, the resulting code blocks of the code channels S0 to S2 are supplied to the 8-PSK symbol mapping (modulation) and the code block of the code channel BPSK is supplied to the BPSK symbol mapping (modulation). The bits of the code block of code channel S0 serves for the bits in s0-position in the 3-bit groups, the bits of code block of code channel S1 serves for the bits in s1-position, and the bits of the code block of code channel S2 serves for the bits in s2-position in the 3-bit groups.

Consequently, the system bits of the turbo code block will be transmitted with either a lower or higher error probability level after reordering and interleaving. Now assume that the reordering functionality is implemented on the basis of a static reordering algorithm and the interleaving functionality is also implemented on the basis of static interleaving algorithm. Type I HARQ with Chase combining shall be used in case of a decoding error of a first transmission. In accordance with the Type I HARQ with Chase combining, the retransmission packet carries the same content as the first transmission packet. Hence, the system bits of the turbo coder 120, which have been transmitted in the first transmission with higher error probability level, are transmitted in the retransmission also with higher error probability level, because of the static reordering algorithm and static interleaving algorithm. The system bits of the turbo coder 120, which have been transmitted in the first transmission with lower error probability level, are transmitted in the retransmission likewise with lower error probability level.

Those skilled in the art will appreciate that the usage of a static reordering algorithm is not favorable. Instead, a dynamic reordering algorithm, i.e. different reordering patterns, should improve the link level performance. Assuming different reordering patterns, the system bits of the turbo coder 120, which have been transmitted in the first transmission with higher error probability level, are transmitted in the retransmission not also necessarily with higher error probability level, because of the varying reordering patterns, mapping the system bits to other positions and hence also onto different code channels.

Figure 8A:
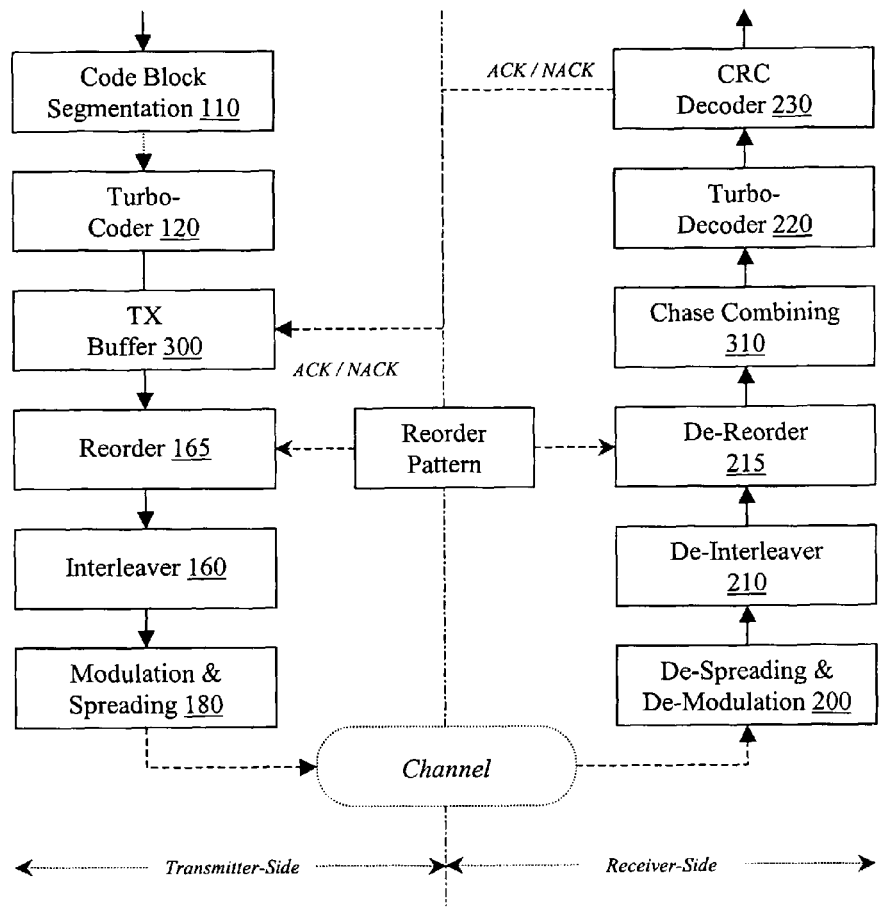
FIG. 8a illustrates schematically an operation sequence scheme for transport channel processing on transmitter-side and receiver-side according to an embodiment of the present invention.
Figure 8B:
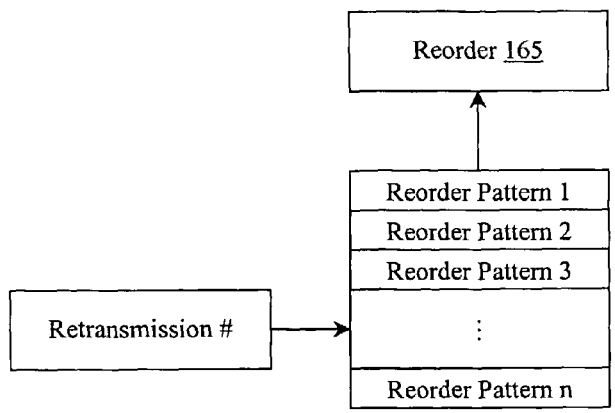
FIG. 8b illustrates schematically an arrangement of reorder patterns to be applied successively on HARQ retransmissions according to an embodiment of the present invention.

With reference to FIGS. 8a and 8b, a transport channel processing one transmitter-side and receiver-side is implemented, which allow the use of varying reorder patterns, especially favorable when employing HARQ schemes.

Referring to FIG. 8a, data arrives to the transport channel structure in form of one transport block once per transmission time interval (TTI). Next, a CRC (cyclic redundancy check) is added by a CRC attachment (not shown) to the transport block. After CRC attachment 100, the transport blocks are formed into different coding blocks by code block segmentation 110 and the channel coder, herein the turbo coder 120, applies the channel coding on the transport blocks to from code blocks. In accordance with Type I Hybrid ARQ with Chase combining a TX-buffer 300 is implemented buffering the code blocks for retransmission if required and indicated by the receiver, herein the base station and Node B, respectively. Next rate matching (not shown) and physical channel segmentation (not shown) is employed.

The reorder functionality 165 is applied on the code blocks of the code channels resulting from the physical channel segmentation. The reordering functionality of the reorder functionality 165 is described in detail above with reference to several embodiments of the present invention. Herein, assume that 8-PSK and BPSK modulation are to be used. Hence, the physical channel segmentation results in four code channels, which is likewise described above with reference to FIG. 5a, to which reference shall be given herewith. The reordering functionality covers the four code channels.

The output of the interleaver 160 is subsequently mapped on the physical channels by the physical channel mapping 170. Finally, spreading and modulation 180 are applied onto the physical channels supplied with data in accordance with the transport channel processing described above. After modulation and spreading the data of the code blocks are transmitted in form of radio frequency signals to the receiver, which is herein the base station or Node B.

After receiving of the radio frequency signals the signals are de-spread and de-modulated by the de-spreading and de-modulation 200 resulting in code blocks. Next, a de-Interleaver 210 is applied to de-interleave the code blocks and then a de-reorder 215 is applied to de-reorder the code blocks. In case the received transmission is a retransmission in accordance with the employed Type I HARQ with Chase combining, the chase combiner 310 combines the original transmission and one or more retransmissions to enable channel de-coding. Subsequently, the channel decoder, i.e. the turbo decoder, is applied and finally, a CRC decoder 230 checks whether the decoding was successful or not. In case of a decoding error is detected by the CRC decoder 230, a non-acknowledgement indication is send to the transmitter indicating the erroneous transmission and instructing the transmitter to operate in accordance with the ARQ scheme, herein Type I HARQ with Chase combining. In case no decoding error is detected, a acknowledgement indication is send to the transmitter.

In order to improve the link level performance, varying reorder patterns have been briefly proposed for being employed in conjunction with the Type I HARQ with Chase combining. Referring to FIG. 8b, a plurality of reorder patterns are predefined and known to the reorder functionality 165 and the de-reorder functionality 215. Several retransmissions can be performed in accordance with Type I HARQ with Chase combining. The plurality of reorder patterns comprises for example one default reorder pattern, which is to be applied for "normal" transmissions or first transmissions. Further, the plurality of reorder patterns comprises a number of n reorder pattern, where a first one (reorder pattern 1) of the n pattern is used for $1^{st}$ retransmission, a second one (reorder pattern 2) of the n pattern is used for $2^{nd}$ retransmission, and so on.

A more specific embodiment of the reorder patterns is illustrated in FIG. 8c. As aforementioned, assume 8-PSK modulation and BPSK modulation within transport channel processing. This means, code blocks in four code channel are available for reordering. Consequently, the patterns have to cover all bits of the code blocks on the four code channels for reordering. The code channels 1 to 4 shall be designated with the characters A, B, C, and D. The designation A0 is to be interpreted as $1^{st}$ bit in code block on channel 1, D1 is to be interpreted as $2^{nd}$ bit in code block on channel 4 and so on. The varying reorder patterns guarantee that the retransmissions are reordered differently to improve the link level performance of the retransmissions and hence the overall link level performance.

Although the embodiments have been described in view of UTRAN (UMTS radio access network) with FDD (frequency division duplex), the inventive concept allows to balance error probability levels of unbalanced error probability levels caused by the use of modulation schemes and in particular of M-PSK modulation schemes. Those skilled in the art will appreciate that the inventive concept is not limited to 8-PSK modulation scheme or 8-PSK and BPSK modulation schemes, on the basis of which embodiments have been described in detail. The scope of the invention is solely defined by the appended claims.

The invention claimed is:

1. A method comprising:
   receiving binary content in code blocks on respective code channels at a transmitter;
   sub-segmenting the binary content of at least two code blocks of the respective code channels at the transmitter; and
   reordering the sub-segments of the code blocks in accordance with a first reordering algorithm, wherein the sub-segments of the binary content are distributed amongst the respective code channels according to predetermined shuffling rules, wherein each reordered code block comprises at least one sub-segment from each of the at least two code blocks, wherein each sub-segment is positioned in the reordered code blocks in a same position of the sub-segment in the at least two code blocks, and wherein the position of the sub-segments within the reordered code blocks substantially balances error probability levels for the respective code channels.

2. The method according to claim 1, wherein a first sub-segment of a code block is reordered to a first error probability level location of a first reordered code block, and wherein a second sub-segment of the code block is reordered to a second error probability level location of a second reordered code block.

3. The method according to claim 1, further comprising:
   interleaving each code block independently from each other, wherein the interleaving is operable before or after the reordering.

4. The method according to claim 1, wherein the first reordering algorithm is based on one or more rules out of a group including:
   reordering pattern tables, which tabulate reordering patterns for the reordering of the sub-segments; and
   permutation algorithms.

5. The method according to claim 1, wherein the first reordering algorithm is one of a static reordering algorithm or a dynamic reordering algorithm, which is altered in accordance with error correction mechanisms for wireless transmissions.

6. The method according to claim 1, wherein the sub-segments comprise one or more bits.

7. The method according to claim 1, further comprising:
   reordering the sub-segments of the code blocks in accordance with a second reordering algorithm, wherein the first reordering algorithm is different from the second reordering algorithm.

8. The method according to claim 1, wherein the reordering algorithm comprises a table of reordering patterns, wherein each reordering pattern is designated for one of the first transmission and the j-th retransmissions, where j=1 to a maximum number of retransmissions.

9. The method according to claim 1, wherein the shuffling includes an overall interleaving scheme, comprising:
   interleaving two or more code blocks on code channels common to the two or more code blocks according to a first interleaving scheme and algorithm; and
   interleaving remaining code blocks on respective code channels separately from each other according to a common interleaving scheme and algorithm or according to individual interleaving schemes and algorithms, wherein the first interleaving algorithm differs from the common interleaving algorithm or the individual algorithms.

10. The method according to claim 9, wherein the first interleaving scheme is an inter-channel interleaving scheme and the common interleaving scheme or the individual interleaving schemes are intra-channel interleaving schemes.

11. The method according to claim 9, wherein the interleaving schemes are selected by considering the different error probability levels.

12. The method according to claim 1, wherein the number of code channels is defined by a total bit length of group lengths of all employed modulation schemes.

13. The method according to claim 1, wherein the modulation schemes comprise at least one $2^m$-array phase shift keying modulation having $2^m$ symbols each being assigned to a predefined group of m bits.

14. The method according to claim 1, further comprising modulating the code blocks on respective code channels using one or more modulation schemes of:

an 8-array phase shift keying modulation having 8 symbols each being assigned to a predefined group of 3 bits; and a binary phase shift keying modulation having two symbols each being assigned to a predefined group of one bit.

15. The method according to claim 1, further comprising:
receiving a transport block at the transmitter;
appending to the transport block a cyclic redundancy check attachment;
segmenting the transport block into one or more code blocks;
applying a channel coding on the code blocks;
applying a rate matching on the code blocks; and
segmenting the code blocks onto several code channels according to a modulation scheme.

16. The method according to claim 1, wherein the transmitter transmits using wideband code division multiple access, in particular with frequency division duplex.

17. The method according to claim 16, wherein the method is applicable for enhanced uplink packet access.

18. A method comprising:
demodulating a signal into binary content comprising code blocks on respective code channels at a receiver;
sub-segmenting the binary content of at least two code blocks of the respective code channels; and
de-shuffling the sub-segments of the binary content of at least two code blocks of the respective code channels at the receiver, wherein the sub-segments of the binary content are de-shuffled amongst the respective code channels in accordance with predetermined de-shuffling rules, wherein each of the at least two code blocks comprises at least one sub-segment from each of the at least two de-shuffled code blocks, wherein each sub-segment is positioned in the code blocks in a same position of the sub-segment in the at least two de-shuffled code blocks, and wherein the position of the sub-segments within the code blocks substantially balances error probability levels for the respective code channels.

19. An apparatus comprising:
a transmitter configured to:
receive binary content in code blocks on respective code channels;
sub-segment the binary content of at least two code blocks of the respective code channels; and
reorder the sub-segments of the binary content of the at least two code blocks of the respective code channels, wherein the sub-segments of the binary content are distributed amongst the respective code channels according to predetermined shuffling rules, wherein each reordered code block comprises at least one sub-segment from each of the at least two code blocks, wherein each sub-segment is positioned in the reordered code blocks in a same position of the sub-segment in the at least two unreordered code blocks, and wherein the position of the sub-segments within the reordered code blocks substantially balances error probability levels for the respective code channels.

20. The apparatus according to claim 19, wherein a first sub-segment of a code block is reordered to a first error probability level location of a first reordered code block, and wherein a second sub-segment of the code block is reordered to a second error probability level location of a second reordered code.

21. The apparatus according to claim 19, wherein the transmitter is further configured to reorder the sub-segments of the code blocks in accordance with a second reordering algorithm, wherein the second reordering algorithm is different than the first recorder algorithm.

22. The apparatus according to claim 19 further comprising:
one or more modified interleavers adapted to interleave two or more code blocks on code channels common to the two or more code blocks and in accordance with a first interleaving algorithm; and further adapted to interleave the remaining code blocks on respective code channels separately from each other according to a common interleaving algorithm or according to individual interleaving algorithms, wherein the first interleaving algorithm differs from the common interleaving algorithm or the individual interleaving algorithms.

23. The apparatus according to claim 19 further comprising a modulator configured to modulate data using one or more modulation schemes out of a group including:
an 8-array phase shift keying modulation having 8 symbols each being assigned to a predefined group of 3 bits; and
a binary phase shift keying modulation having two symbols each being assigned to a predefined group of one bit.

24. The apparatus according to claim 19, wherein the apparatus is a portable device enabling cellular communications over a wideband code division multiple access system, in particular with frequency division duplex.

25. The apparatus according to claim 24, wherein the apparatus is applicable for transmitting data in accordance with the enhanced uplink packet access service.

26. An apparatus comprising:
a receiver configured to:
demodulate a signal into binary content comprising code blocks on respective code channels;
sub-segment the binary content of at least two code blocks of the respective code channels; and
de-shuffle the sub-segments of the binary content of at least two code blocks of the respective code channels, wherein the sub-segments of the binary content are de-shuffled in accordance with predetermined de-shuffling rules, wherein each of the at least two code blocks comprises at least one sub-segment from each of the at least two de-shuffled code blocks, wherein each sub-segment is positioned in the code blocks based upon a position of the sub-segment in the at least two de-shuffled code blocks, and wherein the position of the sub-segments within the code blocks substantially balances error probability levels for the respective code channels.

27. The apparatus according to claim 26, wherein the apparatus is capable for cellular communications over a wideband code division multiple access system, in particular with frequency division duplex.

28. The apparatus according to claim 27, wherein the apparatus is applicable for receiving data in accordance with the enhanced uplink packet access service.

29. A non-transitory computer-readable medium having instructions stored thereon that, if executed by a computing device, cause the computing device to perform operations comprising:
receiving binary content in code blocks on respective code channels;
sub-segmenting the binary content of at least two code blocks of the respective code channels; and
reordering the sub-segments of the binary content of the at least two code blocks of the respective code channels, wherein the sub-segments of the binary content are distributed amongst the respective code channels according to predetermined shuffling rules, wherein each reordered code block comprises at least one sub-segment from each of the at least two code blocks, wherein each sub-segment is positioned in the reordered code blocks in a same position of the sub-segment in the at least two code blocks, and wherein the position of the sub-segments within the reordered code blocks substantially balances error probability levels for the respective code channels.

30. A non-transitory computer-readable medium having instructions stored thereon that, if executed by a computing device, cause the computing device to perform operations comprising:

demodulating a signal into binary content comprising code blocks on respective code channels;

sub-segmenting the binary content of at least two code blocks of the respective code channels;

de-shuffling the sub-segments of the binary content of at least two code blocks of the respective code channels, wherein the sub-segments of the binary content are de-shuffled amongst the respective code channels according to predetermined de-shuffling rules, wherein each of the at least two code blocks comprises at least one sub-segment from each of the at least two de-shuffled code blocks, wherein each sub-segment is positioned in the code blocks in a same position of the sub-segment in the at least two de-shuffled code blocks, and wherein the position of the sub-segments within the code blocks substantially balances error probability levels for the respective code channels.

\* \* \* \* \*

UNITED STATES PATENT AND TRADEMARK OFFICE
CERTIFICATE OF CORRECTION

PATENT NO.         : 8,238,374 B2                                       Page 1 of 1
APPLICATION NO.    : 11/660430
DATED              : August 7, 2012
INVENTOR(S)        : Xu et al.

It is certified that error appears in the above-identified patent and that said Letters Patent is hereby corrected as shown below:

In Fig. 3c, Sheet 7 of 12, delete "  " and insert -- -- , therefor.

In Column 3, Lines 26-27, delete "|Re{z]|-|Im{z}<0," and insert -- |Re{z}|-|Im{z}|<0, --, therefor.

In Column 5, Line 67, delete "Th" and insert -- The --, therefor.

In Column 8, Line 52, delete "invention" and insert -- invention; --, therefor.

In Column 10, Line 37, delete "FIG." and insert -- FIGS. --, therefor.

In Column 10, Line 54, delete "2" and insert -- $2^{nd}$ --, therefor.

In Column 19, Line 47, delete "M-PSK" and insert -- m-PSK --, therefor.

Signed and Sealed this
Twenty-second Day of January, 2013

David J. Kappos
*Director of the United States Patent and Trademark Office*